(12) United States Patent
Jin et al.

(10) Patent No.: US 10,754,938 B2
(45) Date of Patent: Aug. 25, 2020

(54) METHOD FOR ACTIVATING FUNCTION USING FINGERPRINT AND ELECTRONIC DEVICE INCLUDING TOUCH DISPLAY SUPPORTING THE SAME

(71) Applicant: Samsung Electronics Co., Ltd., Suwon-si, Gyeonggi-do (KR)

(72) Inventors: Yun Jang Jin, Yongin-si (KR); Kyung Hoon Song, Yongin-si (KR); Kwang Sub Lee, Yongin-si (KR); Se Young Jang, Seongnam-si (KR); Chi Hyun Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 158 days.

(21) Appl. No.: 15/609,383

(22) Filed: May 31, 2017

(65) Prior Publication Data

US 2017/0351850 A1    Dec. 7, 2017

(30) Foreign Application Priority Data

Jun. 1, 2016    (KR) ........................ 10-2016-0068334

(51) Int. Cl.
*G06K 9/00* (2006.01)
*G06F 21/32* (2013.01)
(Continued)

(52) U.S. Cl.
CPC ............ *G06F 21/32* (2013.01); *G06F 3/0414* (2013.01); *G06F 3/04817* (2013.01);
(Continued)

(58) Field of Classification Search
None
See application file for complete search history.

(56) References Cited

U.S. PATENT DOCUMENTS 6,131,464 A * 10/2000 Pare, Jr. ............. G06K 9/00013
73/714
7,536,039 B2    5/2009 Shinoda et al.
(Continued)

FOREIGN PATENT DOCUMENTS

DE    19832638 A1    1/2000
EP    1617369 A1    1/2006
(Continued)

OTHER PUBLICATIONS

Characteristics of pressure based input for mobile devices, Craig Stewart at el., CHI 2010: Tactile Interaction, Apr. 10-15, 2010, pp. 801-810 (Year: 2010).*

(Continued)

*Primary Examiner* — Jayesh A Patel
(74) *Attorney, Agent, or Firm* — Jefferson IP Law, LLP

(57) ABSTRACT

An electronic device is provided. The electronic device includes a housing, a touch display, a pressure sensing circuit, a fingerprint sensor, a processor, and a memory. The memory is configured to store fingerprint data associated with a plurality of reference fingerprints. The processor is configured to, when pressure is applied by the finger in the fingerprint sensing area, receive first data associated with the pressure from the pressure sensing circuit and receive second data associated with the fingerprint of the finger from the fingerprint sensor, identify a selected function corresponding to the second data based on comparing result of the second data and the reference fingerprint data, and execute the selected function.

18 Claims, 30 Drawing Sheets

(51) Int. Cl.
*H04L 29/06* (2006.01)
*H04L 9/32* (2006.01)
*H04W 12/06* (2009.01)
*G06F 21/81* (2013.01)
*G06F 3/041* (2006.01)
*G06F 3/0481* (2013.01)
*G06F 3/0488* (2013.01)
*H04W 12/00* (2009.01)

(52) U.S. Cl.
CPC .......... *G06F 3/04883* (2013.01); *G06F 21/81* (2013.01); *H04L 9/3231* (2013.01); *H04L 63/0861* (2013.01); *H04W 12/06* (2013.01); *H04W 12/00508* (2019.01)

(56) References Cited

U.S. PATENT DOCUMENTS

| | | | |
|---|---|---|---|
| 8,443,199 B2 | 5/2013 | Kim et al. | |
| 8,477,115 B2 | 7/2013 | Rekimoto | |
| 8,745,490 B2* | 6/2014 | Kim | G06F 3/042 345/173 |
| 8,810,367 B2 | 8/2014 | Mullins | |
| 9,098,735 B2* | 8/2015 | Cho | H03K 17/296 |
| 9,245,165 B2 | 1/2016 | Slaby et al. | |
| 9,477,873 B2 | 10/2016 | Cho et al. | |
| 9,671,889 B1* | 6/2017 | Miller | G06K 9/0002 |
| 9,697,412 B2 | 7/2017 | Ann et al. | |
| 9,928,398 B2* | 3/2018 | Medina | G06F 1/3231 |
| 10,156,921 B1* | 12/2018 | Smith | G06F 3/048 |
| 10,192,091 B2* | 1/2019 | Chung | G06K 9/0002 |
| 10,203,794 B1* | 2/2019 | Smith | G06F 3/04883 |
| 10,262,184 B2* | 4/2019 | Roh | H04M 1/72519 |
| 10,311,278 B2* | 6/2019 | Zhang | G06F 21/32 |
| 10,394,443 B2* | 8/2019 | Li | G06K 9/00 |
| 2006/0034499 A1 | 2/2006 | Shinoda et al. | |
| 2006/0284858 A1* | 12/2006 | Rekimoto | G06F 3/033 345/173 |
| 2008/0105470 A1* | 5/2008 | Van De Ven | G06F 3/0488 178/18.01 |
| 2008/0166028 A1* | 7/2008 | Turek | G06K 9/0002 382/124 |
| 2010/0099394 A1* | 4/2010 | Hainzl | G06F 3/04886 455/418 |
| 2010/0240415 A1* | 9/2010 | Kim | G06F 3/03547 455/565 |
| 2011/0124376 A1* | 5/2011 | Kim | G06F 1/626 455/566 |
| 2012/0071149 A1* | 3/2012 | Bandyopadhyay | G06F 1/1643 455/418 |
| 2012/0306766 A1* | 12/2012 | Moore | G06F 3/0414 345/173 |
| 2013/0076485 A1* | 3/2013 | Mullins | G06F 21/32 340/5.83 |
| 2013/0120302 A1* | 5/2013 | Kang | G06F 1/1652 345/173 |
| 2013/0127592 A1* | 5/2013 | Fyke | G07C 9/37 340/5.53 |
| 2013/0235704 A1 | 9/2013 | Grinberg | |
| 2014/0003677 A1* | 1/2014 | Han | G06K 9/00006 382/124 |
| 2014/0176332 A1* | 6/2014 | Alameh | G06F 21/32 340/665 |
| 2014/0270414 A1* | 9/2014 | Slaby | G06F 21/36 382/124 |
| 2014/0289683 A1* | 9/2014 | Park | G06F 3/0488 715/863 |
| 2014/0292396 A1* | 10/2014 | Bruwer | H03K 17/962 327/517 |
| 2014/0333328 A1* | 11/2014 | Nelson | G06F 3/041 324/663 |
| 2014/0340338 A1* | 11/2014 | Kim | G06F 3/0416 345/173 |
| 2014/0341447 A1 | 11/2014 | Cho et al. | |
| 2014/0354585 A1* | 12/2014 | Cok | G06F 3/0414 345/174 |
| 2014/0359757 A1 | 12/2014 | Sezan et al. | |
| 2015/0036065 A1* | 2/2015 | Yousefpor | H04M 1/0266 349/12 |
| 2015/0047017 A1 | 2/2015 | Kim et al. | |
| 2015/0077343 A1* | 3/2015 | Shao | G06K 9/0002 345/168 |
| 2015/0127965 A1* | 5/2015 | Hong | G06F 1/1694 713/323 |
| 2015/0135080 A1* | 5/2015 | Ji | G06F 3/0416 715/728 |
| 2015/0135108 A1* | 5/2015 | Pope | G06K 9/00006 715/767 |
| 2015/0138155 A1* | 5/2015 | Bernstein | G06F 3/0414 345/174 |
| 2015/0186710 A1 | 7/2015 | Ann et al. | |
| 2015/0220767 A1* | 8/2015 | Yoon | G06F 21/32 382/124 |
| 2015/0234446 A1* | 8/2015 | Nathan | G06F 3/0416 345/174 |
| 2015/0277652 A1* | 10/2015 | Kim | G06Q 20/40 345/174 |
| 2015/0324625 A1* | 11/2015 | Mo | G06F 3/0488 382/124 |
| 2015/0324627 A1 | 11/2015 | Cho et al. | |
| 2015/0363632 A1 | 12/2015 | Am et al. | |
| 2016/0042166 A1* | 2/2016 | Kang | G06F 3/04886 726/7 |
| 2016/0070404 A1* | 3/2016 | Kerr | G06F 3/0418 345/174 |
| 2016/0110093 A1* | 4/2016 | S | G06F 3/017 715/863 |
| 2016/0188181 A1* | 6/2016 | Smith | G06F 3/04817 715/765 |
| 2016/0232342 A1* | 8/2016 | Ganguly | G06F 21/36 |
| 2016/0247013 A1* | 8/2016 | Johansson | G06K 9/00033 |
| 2016/0253041 A1* | 9/2016 | Park | G06F 3/0418 345/174 |
| 2017/0060315 A1* | 3/2017 | Park | G06F 3/0482 |
| 2017/0083045 A1* | 3/2017 | Shim | G06F 1/163 |
| 2017/0193489 A1* | 7/2017 | Jeon | H04B 5/0081 |
| 2017/0220842 A1* | 8/2017 | Thompson | G06F 1/1643 |
| 2017/0255269 A1* | 9/2017 | Yang | G06F 3/041 |
| 2017/0293387 A1* | 10/2017 | Zhang | G06F 3/016 |
| 2017/0316250 A1* | 11/2017 | Roh | H04L 51/04 |
| 2017/0323146 A1* | 11/2017 | Zhang | G06F 3/04817 |
| 2018/0059893 A1* | 3/2018 | Xu | G06F 3/0414 |
| 2018/0074692 A1* | 3/2018 | Lin | G06F 1/3262 |
| 2019/0251329 A1* | 8/2019 | Jiang | G06F 21/81 |

FOREIGN PATENT DOCUMENTS

| | | | | |
|---|---|---|---|---|
| KR | 10-2010-0104648 A | 9/2010 | | |
| KR | 10-2011-0101683 A | 9/2011 | | |
| KR | 10-2014-0047747 A | 4/2014 | | |
| KR | 20140047747 A | * | 4/2014 | |
| KR | 10-2015-0018256 A | 2/2015 | | |
| KR | 20150018256 A | * | 2/2015 | ........... H04L 63/105 |
| KR | 10-2015-0042648 A | 4/2015 | | |
| KR | 10-2015-0144666 A | 12/2015 | | |
| WO | 2014185581 A1 | 11/2014 | | |

OTHER PUBLICATIONS

Christian Zibreg: "It's now technically possible to embed a fingerprint scanner beneath a smartphone display", (May 3, 2016), XP55457327, Retrieved from the Internet: http://www.idownloadblog.com/2016/05/03/lg-in-cell-fingerprint-scanned (retrieved on Mar. 7, 2018).

Anonymous, "iPhone: A visual history / The Verge", Sep. 12, 2014(Sep. 12, 2014), XP55646056, Retrieved from the Internet: URL:https://web.archive.org/web/20140912004102/https://www.theverge.com/2014/9/9/6125849/iphone-history-pictures [retrieved on Nov. 25, 2019].

(56) References Cited

OTHER PUBLICATIONS

European Office Action dated Dec. 2, 2019, issued in European Patent Application No. 17173897.4.

\* cited by examiner

METHOD FOR ACTIVATING FUNCTION USING FINGERPRINT AND ELECTRONIC DEVICE INCLUDING TOUCH DISPLAY SUPPORTING THE SAME

CROSS-REFERENCE TO RELATED APPLICATION(S)

This application claims the benefit under 35 U.S.C. § 119(a) of a Korean patent application filed on Jun. 1, 2016 in the Korean Intellectual Property Office and assigned Serial number 10-2016-0068334, the entire disclosure of which is hereby incorporated by reference.

TECHNICAL FIELD

The present disclosure relates to an electronic device including a touch display and a method for executing a function by using a fingerprint of a user of the electronic device.

BACKGROUND

With the development of technologies, it is important to secure personal information stored in an electronic device. To the end, a method for blocking access of an unauthorized user is provided in a security mechanism such as a pattern lock, a password, or the like. Nowadays, there is used a security method in which a fingerprint of a user is authenticated by using a home key button that is mounted on the front surface of an electronic device and access to the electronic device is permitted if the fingerprint authentication is successful.

A fingerprint authentication method may include a touch method or a touch swipe method. The touch method refers to a method in which the user inputs the fingerprint by maintaining a touch of a finger on a fingerprint sensing area during a specific time period, and the touch swipe method refers to a method in which the user inputs the fingerprint by dragging in a specific direction after touching the fingerprint sensing area.

According to the related art, when the fingerprint recognition is required through the fingerprint sensor mounted under a home key button, the user needs to perform an additional operation for the fingerprint recognition, such as touching the fingerprint sensor using the finger.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Various embodiments of the present disclosure may improve usability of an electronic device by minimizing a user input for fingerprint recognition through a fingerprint sensor and a combination of sensors associated with the fingerprint sensor and by selectively providing various functions.

In accordance with an aspect of the present disclosure, an electronic device is provided. The electronic device includes a housing including a first surface facing a first direction and a second surface facing a second direction opposite to the first direction, a touch display located between the first surface and the second surface and including a screen displayed to face the first surface, a pressure sensing circuit located between the first surface and the second surface and configured to sense pressure applied to the touch display by a finger, a fingerprint sensor located between the first surface and the second surface and configured to sense a fingerprint of the finger in a fingerprint sensing area that overlaps with at least $\frac{1}{30}$ of the screen, a memory and a processor. The memory is configured to store reference fingerprint data associated with a plurality of reference fingerprints. The processor is configured to, when pressure is applied by the finger in the fingerprint sensing area, receive first data associated with the pressure from the pressure sensing circuit and receive second data associated with the fingerprint of the finger from the fingerprint sensor, identify a selected function corresponding to the second data based on comparing result of the second data and the reference fingerprint data, and execute the selected function.

In accordance with another aspect of the present disclosure, a function executing method of an electronic device is provided. The function executing method includes, when pressure is applied to a fingerprint sensing area that overlaps with a part of a screen of a touch display by a finger, receiving first data associated with the pressure using a pressure sensing circuit and receiving second data associated with a fingerprint of the finger using a fingerprint sensor, identifying a selected function corresponding to the second data based on comparing result of the second data and reference fingerprint data associated with a plurality of reference fingerprints stored in the electronic device and executing the selected function.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
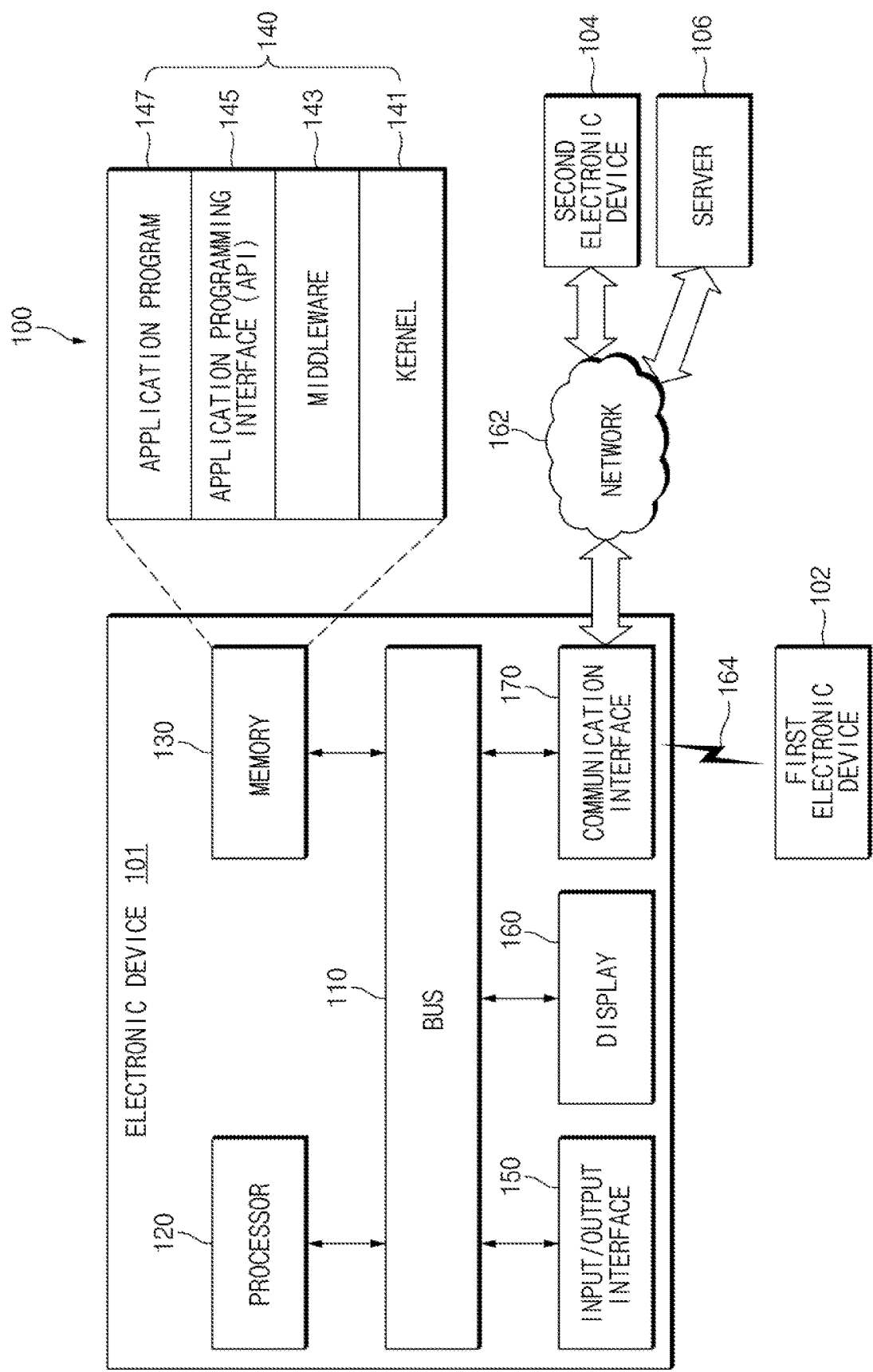
FIG. 1 illustrates a network environment including an electronic device according to various embodiments of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure disclosed herein, the expressions "A or B", "at least one of A or/and B", or "one or more of A or/and B", and the like used herein may include any and all combinations of one or more of the associated listed items. The terms, such as "first", "second", and the like used herein may refer to various elements of various embodiments of the present disclosure, but do not limit the elements. For example, "a first user device" and "a second user device" may indicate different user devices regardless of the order or priority thereof. For example, without departing the scope of the present disclosure, a first element may be referred to as a second element, and similarly, a second element may be referred to as a first element. It will be understood that when an element (e.g., a first element) is referred to as being "(operatively or communicatively) coupled with/to" or "connected to" another element (e.g., a second element), it may be directly coupled with/to or connected to the other element or an intervening element (e.g., a third element) may be present.

According to the situation, the expression "configured to" used herein may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other components. For example, a "processor configured to (or set to) perform A, B, and C" may mean a dedicated processor (e.g., an embedded processor) for performing a corresponding operation or a generic-purpose processor (e.g., a central processing unit (CPU) or an application processor (AP)) which performs corresponding operations by executing one or more software programs which are stored in a memory device.

All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal detect unless expressly so defined herein in various embodiments of the present disclosure. In some cases, even if terms are terms which are defined in the specification, they may not be interpreted to exclude embodiments of the present disclosure.

For example, an electronic device according to various embodiments of the present disclosure may include at least one of smartphones, tablet personal computers (PCs), mobile phones, video telephones, electronic book readers, desktop PCs, laptop PCs, netbook computers, workstations, servers, personal digital assistants (PDAs), portable multimedia players (PMPs), Moving Picture Experts Group (MPEG-1 or MPEG-2) audio layer 3 (MP3) players, mobile medical devices, cameras, or wearable devices. According to various embodiments, a wearable device may include at least one of an accessory type of a device (e.g., a timepiece, a ring, a bracelet, an anklet, a necklace, glasses, a contact lens, or a head-mounted-device (HMD)), one-piece fabric or clothes type of a device (e.g., electronic clothes), a body-attached type of a device (e.g., a skin pad or a tattoo), or a bio-implantable type of a device (e.g., implantable circuit).

In some various embodiments of the present disclosure, an electronic device may be a home appliance. The smart home appliance may include at least one of, for example, a television (TV), a digital versatile disc (DVD) player, an audio, a refrigerator, an air conditioner, a cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ or PlayStation™), an electronic dictionary, an electronic key, a camcorder, or an electronic picture frame.

In various embodiments, the electronic devices may include at least one of various medical devices (e.g., various portable medical measurement devices (e.g., blood glucose meters, heart rate meters, blood pressure meters, or thermometers, and the like), a magnetic resonance angiography (MRA), a magnetic resonance imaging (MRI), a computed tomography (CT), scanners, or ultrasonic devices, and the like), navigation devices, global navigation satellite system (GNSS), event data recorders (EDRs), flight data recorders (FDRs), vehicle infotainment devices, electronic equipment for vessels (e.g., navigation systems, gyrocompasses, and the like), avionics, security devices, head units for vehicles, industrial or home robots, automatic teller's machines (ATMs), points of sales (POSs), or internet of things (e.g., light bulbs, various sensors, electric or gas meters, sprinkler devices, fire alarms, thermostats, street lamps, toasters, exercise equipment, hot water tanks, heaters, boilers, and the like).

According to various embodiments, the electronic devices may include at least one of parts of furniture or buildings/structures, electronic boards, electronic signature receiving devices, projectors, or various measuring instruments (e.g., water meters, electricity meters, gas meters, or wave meters, and the like). The electronic devices according to various embodiments of the present disclosure may be one or more combinations of the above-mentioned devices. The electronic devices according to various embodiments of the present disclosure may be flexible electronic devices. Also, electronic devices according to various embodiments of the present disclosure are not limited to the above-mentioned devices, and may include new electronic devices according to technology development. The term "user" used herein may refer to a person who uses an electronic device or may refer to a device (e.g., an artificial intelligence electronic device) that uses an electronic device.

FIG. 1 illustrates an electronic device in a network environment according to an embodiment of the present disclosure.

Referring to FIG. 1, an electronic device 101 in a network environment 100 according to various embodiments of the present disclosure will be described. The electronic device 101 may include a bus 110, a processor 120, a memory 130, an input/output interface 150, a display 160, and a communication interface 170. In various embodiments of the present disclosure, at least one of the foregoing elements may be omitted or another element may be added to the electronic device 101.

The bus 110 may include a circuit for connecting the above-mentioned elements 110 to 170 to each other and transferring communications (e.g., control messages and/or data) among the above-mentioned elements.

The processor 120 may include at least one of a CPU, an AP, or a communication processor (CP). The processor 120 may perform data processing or an operation related to communication and/or control of at least one of the other elements of the electronic device 101.

The memory 130 may include a volatile memory and/or a nonvolatile memory. The memory 130 may store instructions or data related to at least one of the other elements of the electronic device 101. According to an embodiment of the present disclosure, the memory 130 may store software and/or a program 140. The program 140 may include, for example, a kernel 141, a middleware 143, an application programming interface (API) 145, and/or an application 147. At least a portion of the kernel 141, the middleware 143, or the API 145 may be referred to as an operating system (OS).

The kernel 141 may control or manage system resources (e.g., the bus 110, the processor 120, the memory 130, or the like) used to perform operations or functions of other programs (e.g., the middleware 143, the API 145, or the application 147). Furthermore, the kernel 141 may provide an interface for allowing the middleware 143, the API 145, or the application 147 to access individual elements of the electronic device 101 to control or manage the system resources.

The middleware 143 may serve as an intermediary so that the API 145 or the application 147 communicates and exchanges data with the kernel 141.

Furthermore, the middleware 143 may handle one or more task requests received from the application 147 according to a priority order. For example, the middleware 143 may assign at least one application 147 a priority for using the system resources (e.g., the bus 110, the processor 120, the memory 130, or the like) of the electronic device 101. For example, the middleware 143 may handle the one or more task requests according to the priority assigned to the at least one application, thereby performing scheduling or load balancing with respect to the one or more task requests.

The API 145, which is an interface for allowing the application 147 to control a function provided by the kernel 141 or the middleware 143, may include, for example, at least one interface or function (e.g., instructions) for file control, window control, image processing, character control, or the like.

The input/output interface 150 may serve to transfer an instruction or data input from a user or another external device to (an)other element(s) of the electronic device 101. Furthermore, the input/output interface 150 may output instructions or data received from (an)other element(s) of the electronic device 101 to the user or another external device.

The display 160 may include, for example, a liquid crystal display (LCD), a light-emitting diode (LED) display, an organic light-emitting diode (OLED) display, a microelectromechanical systems (MEMS) display, or an electronic paper display. The display 160 may present various content (e.g., a text, an image, a video, an icon, a symbol, or the like) to the user. The display 160 may include a touch screen, and may receive a touch, gesture, proximity or hovering input from an electronic pen or a part of a body of the user.

The communication interface 170 may set communications between the electronic device 101 and an external device (e.g., a first electronic device 102, a second electronic device 104, or a server 106). For example, the communication interface 170 may be connected to a network 162 via wireless communications or wired communications to communicate with the external device (e.g., the second electronic device 104 or the server 106).

The wireless communications may employ at least one of cellular communication protocols such as long-term evolution (LTE), LTE-advance (LTE-A), code division multiple access (CDMA), wideband CDMA (WCDMA), universal mobile telecommunications system (UMTS), wireless broadband (WiBro), or global system for mobile communications (GSM). The wireless communications may include, for example, a short-range communication link 164. The short-range communication link may include at least one of Wi-Fi, Bluetooth®, Bluetooth low energy (BLE), Zigbee®, near field communication (NFC), magnetic secure transmission (MST), or GNSS. The GNSS may include, for example, at least one of global positioning system (GPS), global navigation satellite system (GLONASS), BeiDou navigation satellite system (BeiDou), or Galileo, the European global satellite-based navigation system according to a use area or a bandwidth. Hereinafter, the term "GPS" and the term "GNSS" may be interchangeably used.

The wired communications may include at least one of universal serial bus (USB), high definition multimedia interface (HDMI), recommended standard 232 (RS-232), plain old telephone service (POTS), or the like. The network 162 may include at least one of telecommunications networks, for example, a computer network (e.g., local area network (LAN) or wide area network (WAN)), the Internet, or a telephone network.

The types of the first electronic device 102 and the second electronic device 104 may be the same as or different from the type of the electronic device 101. According to an embodiment of the present disclosure, the server 106 may include a group of one or more servers. A portion or all of operations performed in the electronic device 101 may be performed in one or more other electronic devices (e.g., the first electronic device 102, the second electronic device 104, or the server 106). When the electronic device 101 should perform a certain function or service automatically or in response to a request, the electronic device 101 may request at least a portion of functions related to the function or service from another device (e.g., the first electronic device 102, the second electronic device 104, or the server 106) instead of or in addition to performing the function or service for itself. The other electronic device (e.g., the first electronic device 102, the second electronic device 104, or the server 106) may perform the requested function or additional function, and may transfer a result of the performance to the electronic device 101. The electronic device 101 may use a received result itself or additionally process the received result to provide the requested function or service. To this end, for example, a cloud computing technology, a distributed computing technology, or a client-server computing technology may be used.

Figure 2:
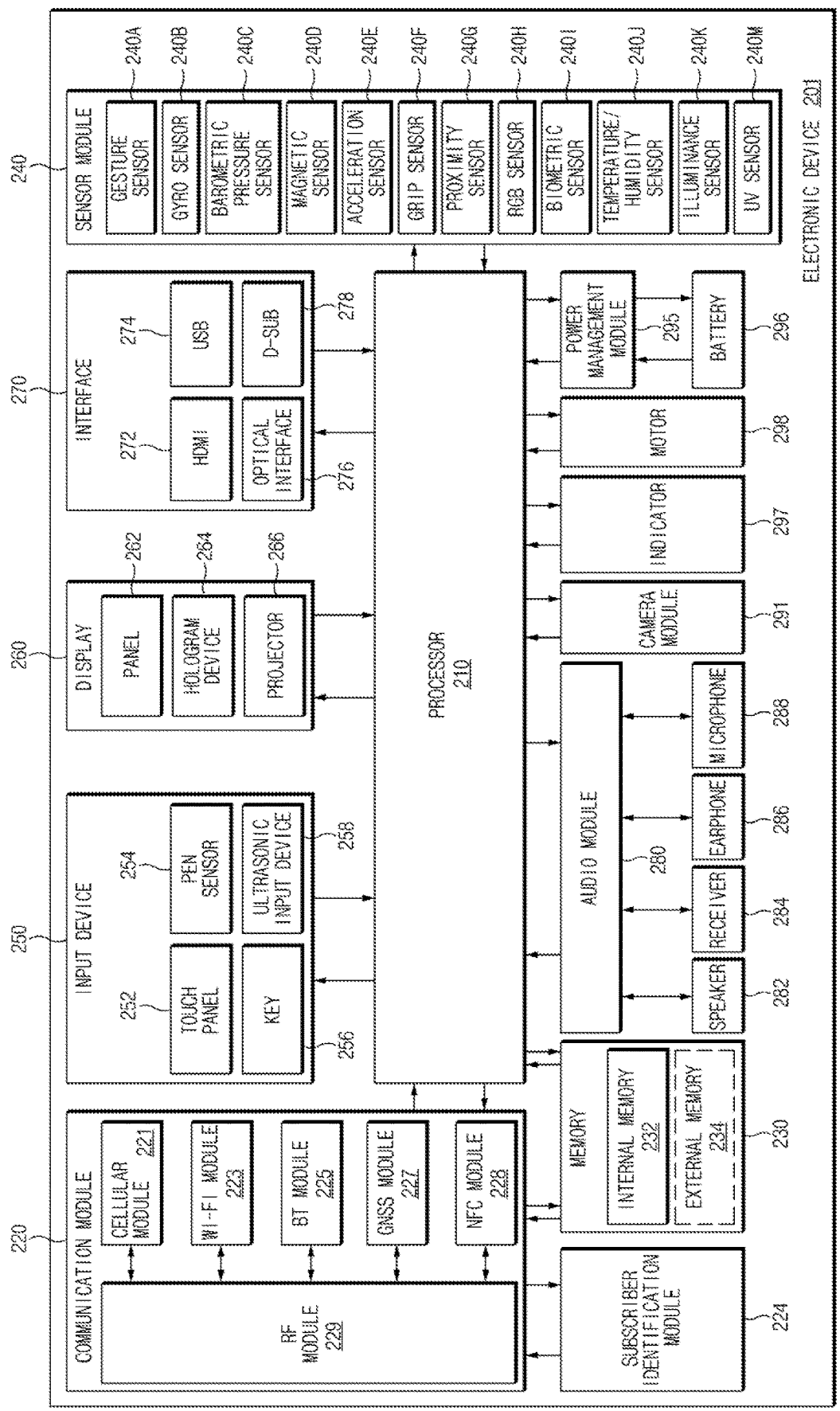
FIG. 2 is a block diagram of an electronic device according to various embodiments of the present disclosure.

FIG. 2 is a block diagram illustrating an electronic device according to an embodiment of the present disclosure.

Referring to FIG. 2, an electronic device 201 may include, for example, a part or the entirety of the electronic device 101 illustrated in FIG. 1. The electronic device 201 may include at least one processor (e.g., AP) 210, a communication module 220, a subscriber identification module (SIM) 224, a memory 230, a sensor module 240, an input device 250, a display 260, an interface 270, an audio module 280, a camera module 291, a power management module 295, a battery 296, an indicator 297, and a motor 298.

The processor 210 may run an OS or an application so as to control a plurality of hardware or software elements connected to the processor 210, and may process various data and perform operations. The processor 210 may be implemented with, for example, a system on chip (SoC). According to an embodiment of the present disclosure, the processor 210 may further include a graphic processing unit (GPU) and/or an image signal processor (ISP). The processor 210 may include at least a portion (e.g., a cellular module 221) of the elements illustrated in FIG. 2. The processor 210 may load, on a volatile memory, an instruction or data received from at least one of other elements (e.g., a nonvolatile memory) to process the instruction or data, and may store various data in a nonvolatile memory.

The communication module 220 may have a configuration that is the same as or similar to that of the communication interface 170 of FIG. 1. The communication module 220 may include, for example, a cellular module 221, a Wi-Fi module 223, a Bluetooth module 225, a GNSS module 227 (e.g., a GPS module, a GLONASS module, a BeiDou module, or a Galileo module), an NFC module 228 and a radio frequency (RF) module 229.

The cellular module 221 may provide, for example, a voice call service, a video call service, a text message service, or an Internet service through a communication network. The cellular module 221 may identify and authenticate the electronic device 201 in the communication network using the SIM 224 (e.g., a SIM card). The cellular module 221 may perform functions that may be provided by the processor 210. The cellular module 221 may include a CP.

Each of the Wi-Fi module 223, the Bluetooth module 225, the GNSS module 227 and the NFC module 228 may include, for example, a processor for processing data transmitted/received through the modules. According to some various embodiments of the present disclosure, a part (e.g., two or more) of the cellular module 221, the Wi-Fi module 223, the Bluetooth module 225, the GNSS module 227 and the NFC module 228 may be included in a single integrated circuit (IC) or IC package.

The RF module 229 may transmit/receive, for example, communication signals (e.g., RF signals). The RF module 229 may include, for example, a transceiver, a power amplifier module (PAM), a frequency filter, a low noise amplifier (LNA), an antenna, or the like. According to another embodiment of the present disclosure, at least one of the cellular module 221, the Wi-Fi module 223, the Bluetooth module 225, the GNSS module 227 and the NFC module 228 may transmit/receive RF signals through a separate RF module.

The SIM 224 may include, for example, an embedded SIM and/or a card containing the subscriber identity module, and may include unique identification information (e.g., an IC card identifier (ICCID)) or subscriber information (e.g., international mobile subscriber identity (IMSI)).

The memory 230 (e.g., the memory 130) may include, for example, an internal memory 232 or an external memory 234. The internal memory 232 may include at least one of a volatile memory (e.g., a dynamic RAM (DRAM), a static RAM (SRAM), a synchronous dynamic RAM (SDRAM), or the like), a nonvolatile memory (e.g., a one-time programmable ROM (OTPROM), a programmable ROM (PROM), an erasable and programmable ROM (EPROM), an electrically erasable and programmable ROM (EEPROM), a mask ROM, a flash ROM, a flash memory (e.g., a NAND flash memory, a NOR flash memory, or the like)), a hard drive, or a solid state drive (SSD).

The external memory 234 may include a flash drive such as a compact flash (CF), a secure digital (SD), a micro-SD, a mini-SD, an extreme digital (xD), a multi media card (MMC), a memory stick, or the like. The external memory 234 may be operatively and/or physically connected to the electronic device 201 through various interfaces.

A security module (not shown), which is a module including a storage space that is higher in security level than the memory 230, may securesafe data storage and protected execution circumstances. The security module may be implemented with an additional circuit and may include an additional processor. The security module may be present in an attachable smart chip or SD card, or may include an embedded secure element (eSE), which is installed in a fixed chip. Additionally, the security module may be driven in another OS which is different from the OS of the electronic device 201. For example, the security module may operate based on a java card open platform (JCOP) OS.

The sensor module 240 may, for example, measure physical quantity or detect an operation state of the electronic device 201 so as to convert measured or detected information into an electrical signal. The sensor module 240 may include, for example, at least one of a gesture sensor 240A, a gyro sensor 240B, a barometric pressure sensor 240C, a magnetic sensor 240D, an acceleration sensor 240E, a grip sensor 240F, a proximity sensor 240G, a color sensor 240H (e.g., a red/green/blue (RGB) sensor), a biometric sensor 240I, a temperature/humidity sensor 240J, an illumination sensor 240K, or an ultraviolet (UV) sensor 240M. Additionally or alternatively, the sensor module 240 may include, for example, an olfactory sensor (E-nose sensor), an electromyography (EMG) sensor, an electroencephalogram (EEG) sensor, an electrocardiogram (ECG) sensor, an infrared (IR) sensor, an iris recognition sensor, and/or a fingerprint sensor. The sensor module 240 may further include a control circuit for controlling at least one sensor included therein. In some various embodiments of the present disclosure, the electronic device 201 may further include a processor configured to control the sensor module 240 as a part of the processor 210 or separately, so that the sensor module 240 is controlled while the processor 210 is in a sleep state.

The input device 250 may include, for example, a touch panel 252, a (digital) pen sensor 254, a key 256, or an ultrasonic input device 258. The touch panel 252 may employ at least one of capacitive, resistive, infrared, and ultraviolet sensing methods. The touch panel 252 may further include a control circuit. The touch panel 252 may further include a tactile layer so as to provide a haptic feedback to a user.

The (digital) pen sensor 254 may include, for example, a sheet for recognition which is a part of a touch panel or is separate. The key 256 may include, for example, a physical button, an optical button, or a keypad. The ultrasonic input device 258 may sense ultrasonic waves generated by an input tool through a microphone 288 so as to identify data corresponding to the ultrasonic waves sensed.

The display 260 (e.g., the display 160) may include a panel 262, a hologram device 264, or a projector 266. The panel 262 may have a configuration that is the same as or similar to that of the display 160 of FIG. 1. The panel 262 may be, for example, flexible, transparent, or wearable. The panel 262 and the touch panel 252 may be integrated into a single module. The hologram device 264 may display a stereoscopic image in a space using a light interference phenomenon. The projector 266 may project light onto a screen so as to display an image. The screen may be disposed in the inside or the outside of the electronic device 201. According to an embodiment of the present disclosure, the display 260 may further include a control circuit for controlling the panel 262, the hologram device 264, or the projector 266.

The interface 270 may include, for example, an HDMI 272, a USB 274, an optical interface 276, or a D-subminiature (D-sub) 278. The interface 270, for example, may be included in the communication interface 170 illustrated in FIG. 1. Additionally or alternatively, the interface 270 may include, for example, a mobile high-definition link (MHL) interface, an SD card/MMC interface, or an infrared data association (IrDA) interface.

The audio module 280 may convert, for example, a sound into an electrical signal or vice versa. At least a portion of elements of the audio module 280 may be included in the input/output interface 150 illustrated in FIG. 1. The audio module 280 may process sound information input or output through a speaker 282, a receiver 284, an earphone 286, or the microphone 288.

The camera module 291 is, for example, a device for shooting a still image or a video. According to an embodiment of the present disclosure, the camera module 291 may include at least one image sensor (e.g., a front sensor or a rear sensor), a lens, an ISP, or a flash (e.g., an LED or a xenon lamp).

The power management module 295 may manage power of the electronic device 201. According to an embodiment of the present disclosure, the power management module 295 may include a power management integrated circuit (PMIC), a charger integrated circuit (IC), or a battery gauge. The PMIC may employ a wired and/or wireless charging method. The wireless charging method may include, for example, a magnetic resonance method, a magnetic induction method, an electromagnetic method, or the like. An additional circuit for wireless charging, such as a coil loop, a resonant circuit, a rectifier, or the like, may be further included. The battery gauge may measure, for example, a remaining capacity of the battery 296 and a voltage, current or temperature thereof while the battery is charged. The battery 296 may include, for example, a rechargeable battery and/or a solar battery.

The indicator 297 may display a specific state of the electronic device 201 or a part thereof (e.g., the processor 210), such as a booting state, a message state, a charging state, or the like. The motor 298 may convert an electrical signal into a mechanical vibration, and may generate a vibration or haptic effect. Although not illustrated, a processing device (e.g., a GPU) for supporting a mobile TV may be included in the electronic device 201. The processing device for supporting a mobile TV may process media data according to the standards of digital multimedia broadcasting (DMB), digital video broadcasting (DVB), Media-FLO™, or the like.

Figure 3:
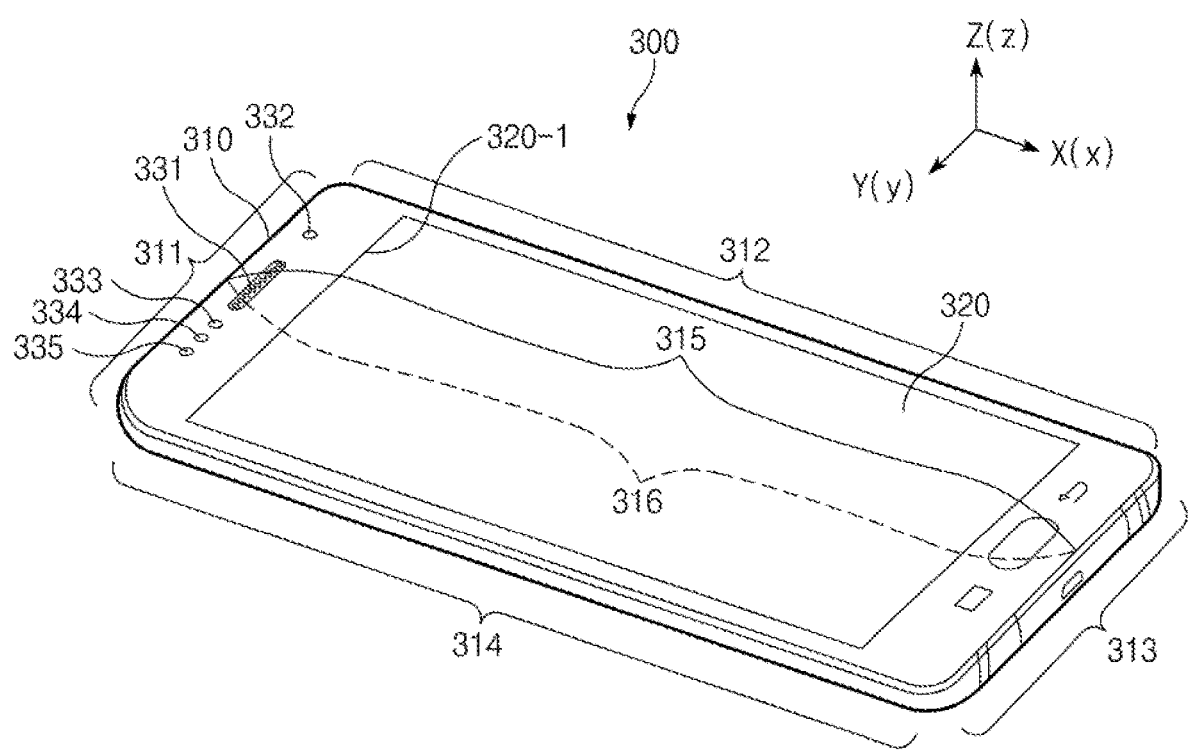
FIG. 3 is a perspective view of an electronic device according to an embodiment of the present disclosure.

FIG. 3 is a perspective view of an electronic device according to an embodiment of the present disclosure.

Referring to FIG. 3, an electronic device 300 may include, for example, all or a part of the electronic device 101 illustrated in FIG. 1. Alternatively, the electronic device 300 may include all or a part of the electronic device 201 illustrated in FIG. 2.

Referring to FIG. 3, a rectangular coordinate system is used. The x-axis 'x' indicates a longitudinal direction (e.g., a long side direction) of the electronic device 300. The y-axis 'y' indicates a lateral direction (e.g., a short side direction) of the electronic device 300. The z-axis 'z' indicates a vertical direction (e.g., a thickness direction) of the electronic device 300.

According to various embodiments of the present disclosure, the electronic device 300 may include a housing 310 including a first surface 315 that faces a first direction 'z' and a second surface 316 that faces a second direction '-z' opposite to the first direction 'z'. The housing 310 may include elements of the electronic device 300 (e.g., a display, a sensor module, a memory, a processor, and the like) in the electronic device 300. For example, the elements of the electronic device 300 may be located between the first surface 315 and the second surface 316 of the housing 310. According to an embodiment, generally, the housing 310 may be a rectangular plate. The housing 310 may be formed of materials, for example, plastic, metal, carbon fiber and other fiber composites, ceramics, glass, and wood or combinations of the materials. In this case, the first surface 315 may include a first periphery 311 having a first length, a second periphery 312, which has a second length longer than the first length and extends to be perpendicular to the first periphery 311, a third periphery 313, which has the first length and extends to be parallel with the first periphery 311, and a fourth periphery 314, which has the second length and extends to be parallel with the second periphery 312.

According to various embodiments, the housing 310 may include the display 320 on the first surface 315 (or an upper surface). The display 320 may include a screen exposed to the outside through the first surface 315 of the housing 310. The display 320 may include all or a part of the display 160 and the input/output (I/O) interface 150 that are illustrated in FIG. 1. In addition, the display 320 may include all or a part of the display 260 and the input device 250 that are illustrated in FIG. 2.

Referring to FIG. 3, the display 320 may include at least one of a touch display including a touch panel, a pressure sensing module (not illustrated), and a fingerprint sensing module (not illustrated).

According to various embodiments, a speaker 331 that outputs voice of a counterpart may be disposed on an upper portion of the display 320. For example, the speaker 331 may be disposed between the first periphery 311 and one side surface 320-1 of the display 320. Components that execute various functions of the electronic device 300 may be disposed on a peripheral area in which the speaker 331 is mounted. For example, the components may include at least one or more sensors 332, 333, and 334. For example, each of the sensors 332, 333, and 334 may include at least one of an illumination sensor (e.g., a light sensor), a proximity sensor (e.g., a light sensor), an infrared ray sensor, or an ultrasonic sensor. As another example, at least one front camera 335 may be included on the front surface of the housing 310.

According to various embodiments, the display 320 may be formed to occupy most of the front surface of the electronic device 300. In this case, when the screen of the electronic device 300 is unlocked, a main home screen may be a first screen that is displayed on the display 320. For example, when the electronic device 300 includes different home screens of several pages, a main home screen may be the first home screen. Application identification information (e.g., an application icon or an application name) for executing applications, a main menu switching key, time, weather, and the like may be displayed in the home screen.

According to various embodiments, at least one key button may be disposed on at least a partial area of the front surface of the housing 310 other than the display 320. For example, the key button may execute a home key button function. A fingerprint sensor may be disposed on the home key button.

According to various embodiments, the display 320 may include a curved surface on one side or opposite sides. As another example, the display 320 may include the curved surface part with curvature. For example, the curved surface part may extend along a display edge area. According to an embodiment, the electronic device 300 may selectively display at least a portion of information by controlling the display 320.

Figure 4:
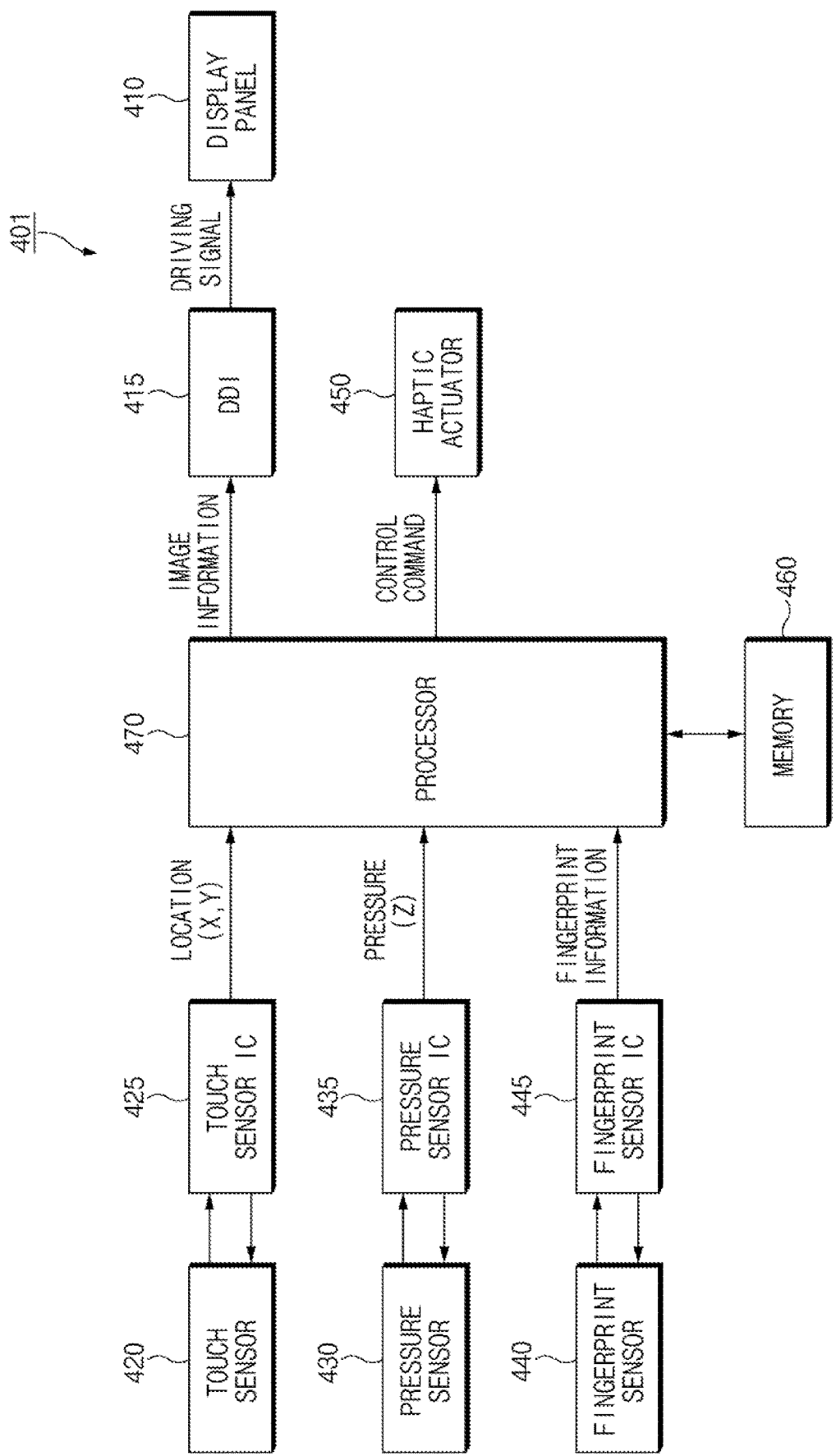
FIG. 4 is a block diagram of an electronic device according to various embodiments of the present disclosure.

FIG. 4 is a block diagram of an electronic device according to various embodiments of the present disclosure.

Referring to FIG. 4, an electronic device 401 (e.g., the electronic device 300 of FIG. 3) may include a display panel 410, a display driving IC (DDI) 415, a touch sensor 420, a touch sensor IC 425, a pressure sensor 430, a pressure sensor IC 435, a fingerprint sensor 440, a fingerprint sensor IC 445, a haptic actuator 450, a memory 460, and a processor 470. For example, the processor 470 may include all or a part of the processor 120 illustrated in FIG. 1 and the processor 210 illustrated in FIG. 2. As another example, the memory 460 may include all or a part of the memory 130 illustrated in FIG. 1 and/or the memory 230 illustrated in FIG. 2. As another example, the display panel 410 and/or the DDI 415 may include all or a part of the display 160 illustrated in FIG. 1 and/or the display 260 illustrated in FIG. 2. As another example, the touch sensor 420 and/or the touch sensor IC 425 may include all or a part of the touch panel 252 illustrated in FIG. 2.

According to various embodiments, the display panel 410 may receive an image driving signal from the DDI 415. The display panel 410 may display a variety of content (e.g., a text, an image, a video, an icon, a symbol, or the like) based on the image driving signal. For example, the display panel 410 may overlay the touch sensor 420, the pressure sensor 430, and/or the fingerprint sensor 440 (e.g., refer to FIG. 5A or 5B). For example, when the display panel 410 and the touch sensor 420 are combined with each other, the combined structure may be referred to as a "touch screen display".

According to various embodiments, the DDI 415 may transmit the image driving signal corresponding to image information, which is received from the processor 470 (e.g., a host), to the display panel 410 at a preset framerate. Although not illustrated in FIG. 4, according to various embodiments, the DDI 415 may include a graphic RAM, an interface module, an image processing unit, a multiplexer, a display timing controller (T-con), a source driver, a gate driver, and/or an oscillator.

According to various embodiments, in the touch sensor 420, a specified physical quantity (e.g., a voltage, light intensity, resistance, charge amount, capacitance, or the like) may be changed by a touch from a user. According to an embodiment, the touch sensor 420 may be disposed to be overlaid with the display panel 410.

According to various embodiments, the touch sensor IC 425 may sense a change in the physical quantity in the touch sensor 420 and may calculate a location (X,Y) at which a touch is received based on the change in the physical quantity (e.g., voltage, resistance, capacitance, or the like). The calculated location (i.e., coordinates) may be provided to the processor 470.

For example, if a portion of user's body (e.g., a finger), a stylus (an example of an electronic pen), or the like contacts the glass (not illustrated) of a display, a coupling voltage between transmitter Tx and/or receiver Rx included in the touch sensor 420 may be changed. For example, the change of the coupling voltage may be sensed by the touch sensor IC 425, and the touch sensor IC 425 may transmit coordinates of the touch location to the processor 470. The processor 470 may obtain data associated with the location coordinates as an event of a user input.

According to various embodiments, the touch sensor IC 425 may be referred to a touch IC, a touch screen IC, a touch controller, a touch screen controller IC, or the like. According to various embodiments, in an electronic device in which the touch sensor IC 425 is not included, the processor 470 may perform functions associated with the touch sensor IC 425. According to various embodiments, the touch sensor IC 425 and the processor 470 may be implemented with one configuration (e.g., a single IC).

According to various embodiments, the pressure sensor 430 may sense external pressure (i.e., a force) in a pressure sensing area. For example, the pressure sensing area may be a part of or the whole of the display panel 410. For example, the pressure sensor 430 may obtain pressure data indicating the intensity of the pressure which is applied by a finger of the user to a touch display (or a touch screen). According to an embodiment, in the pressure sensor 430, the physical quantity (e.g., capacitance) between the transmitter Tx (e.g., a first electrode 551 of FIG. 5A or 5B) and the receiver Rx (e.g., a second electrode 552 of FIG. 5A or 5B) may change based on the touch.

According to various embodiments, the pressure sensor IC 435 may sense the change in the physical quantity (e.g., capacitance, or the like) in the pressure sensor 430 and may calculate pressure Z, which is applied by the touch of the user, based on the change in the physical quantity. The pressure value may be provided to the processor 470 together with the location (X, Y) at which the touch is performed.

According to various embodiments, the pressure sensor IC 435 may be referred to a force touch controller, a force sensor IC, a pressure panel IC, or the like. In addition, according to various embodiments, the pressure sensor IC 435 and the touch sensor IC 425 may be implemented with one configuration (e.g., a single IC).

According to various embodiments, the fingerprint sensor 440 may sense a user's fingerprint in a fingerprint sensing area. For example, the fingerprint sensing area may correspond to a part of or the whole of the display panel 410. The fingerprint sensor 440 may obtain fingerprint data of the finger and may obtain feature information about minutiae of the fingerprint indicating a bifurcation point, an end point, a core, delta, a ridge of the fingerprint, and a direction, a shape, or the like of valleys between ridges. For example, the feature information may be calculated in a preset format. The fingerprint sensor 440 may be classified into an optical sensor, an ultrasonic sensor, or a capacitive sensor according to the physical quantity used to obtain the fingerprint data. As another example, an area method in which the fingerprint is recognized in units of surface may be applied to the fingerprint sensor 440.

According to various embodiments, the fingerprint sensor IC 445 may drive the fingerprint sensor 440 and may scan at least a partial area of the fingerprint sensor 440. The fingerprint sensor IC 445 may capture a fingerprint image through the scanning operation. For example, the fingerprint sensor IC 445 may extract a unique feature of the fingerprint from the fingerprint image and may provide the extracted feature as fingerprint information to the processor 470. For example, the extracted feature, that is, fingerprint minutiae may include a ridge ending, crossover, bifurcation, a pore, or the like included in the fingerprint.

According to various embodiments, the haptic actuator 450 may provide the user with haptic feedback (e.g., vibration), based on a control command of the processor 470. For example, when a touch input (e.g., including a touch, a hovering, or a force touch) is received from the user, the haptic actuator 450 may provide the user with the haptic feedback.

According to various embodiments, the memory 460 may store an instruction or data associated with an operation of the element included in the electronic device 401. For example, the memory 460 may store instructions, and when executed, the instructions may cause the processor 470 to perform various operations described in the present disclosure.

According to an embodiment, the memory 460 may store reference fingerprint data that is associated with a plurality of reference fingerprints respectively corresponding to a plurality of functions that are performed by the electronic device 401.

According to various embodiments of the present disclosure, for example, the functions may include a telephony application execution function, a text input application execution function, a message application execution function, a social network service application execution function, a voice recognition application execution function, a schedule management application execution function, a calendar application execution function, and/or a web browsing execution executing function.

As another example, each of the functions may be associated with a function that the application is capable of providing. For example, when the application is the telephony application, the function may include a function to call a destination mapped to the first speed dial number, a function to call a destination mapped to the second speed dial number, a function to verify a missed call list, a function to verify a received message, a function to write a message, or the like.

According to various embodiments, while the pressure is applied by a finger to a part of a screen area, the processor 470 may receive fingerprint data associated with the fingerprint from the fingerprint sensor 440 and may compare the fingerprint data with reference fingerprint data that is stored in the memory 460. The processor 470 may perform a function that corresponds to a matching reference fingerprint data.

According to various embodiments, the memory 460 may store instructions. While the pressure is applied by the finger to a part of the screen area overlapping with the fingerprint sensing area, the instructions may cause the processor 470 to receive pressure data from the pressure sensor 430, receive fingerprint data associated with the fingerprint of the finger from the fingerprint sensor 440, compare the received fingerprint data with at least one of the pieces of reference fingerprint data, and execute a function selected from the plurality of functions based on the comparison result.

According to various embodiments, the memory 460 may store instructions. When the electronic device 401 operates in a locked screen mode, the instructions may cause the processor 470 to change from the locked screen mode to an unlocked screen mode and to execute a function selected from the plurality of functions based on the comparison result.

According to various embodiments, the memory 460 may store instructions. When a part of the screen area to which the pressure is applied by the finger is an area in which identification information of an application is displayed, the instructions may cause the processor 470 to execute one of a plurality of functions that the application is capable of providing, based on the comparison result.

According to various embodiments, the memory 460 may store instructions. In the case where a part of the screen area to which the pressure is applied by the finger is an area where identification information of an application with respect to which a lock function is set is displayed, the instructions may cause the processor 470 to execute the application with respect to which the lock function is released, based on the comparison result.

According to various embodiments, the memory 460 may store instructions. In the case where the electronic device 401 operates in a sleep mode, the instructions may cause the processor 470 to change the mode of the electronic device 401 from the sleep mode to a wakeup mode, if the pressure data is received from the pressure sensor 430.

According to various embodiments, the memory 460 may store an OS, an API, and a plurality of programs set to operate the OS through the API. In this case, the plurality of functions respectively corresponding to the pieces of reference fingerprint data may include one or more functions associated with at least one of programs of the plurality of applications.

Figure 5A:
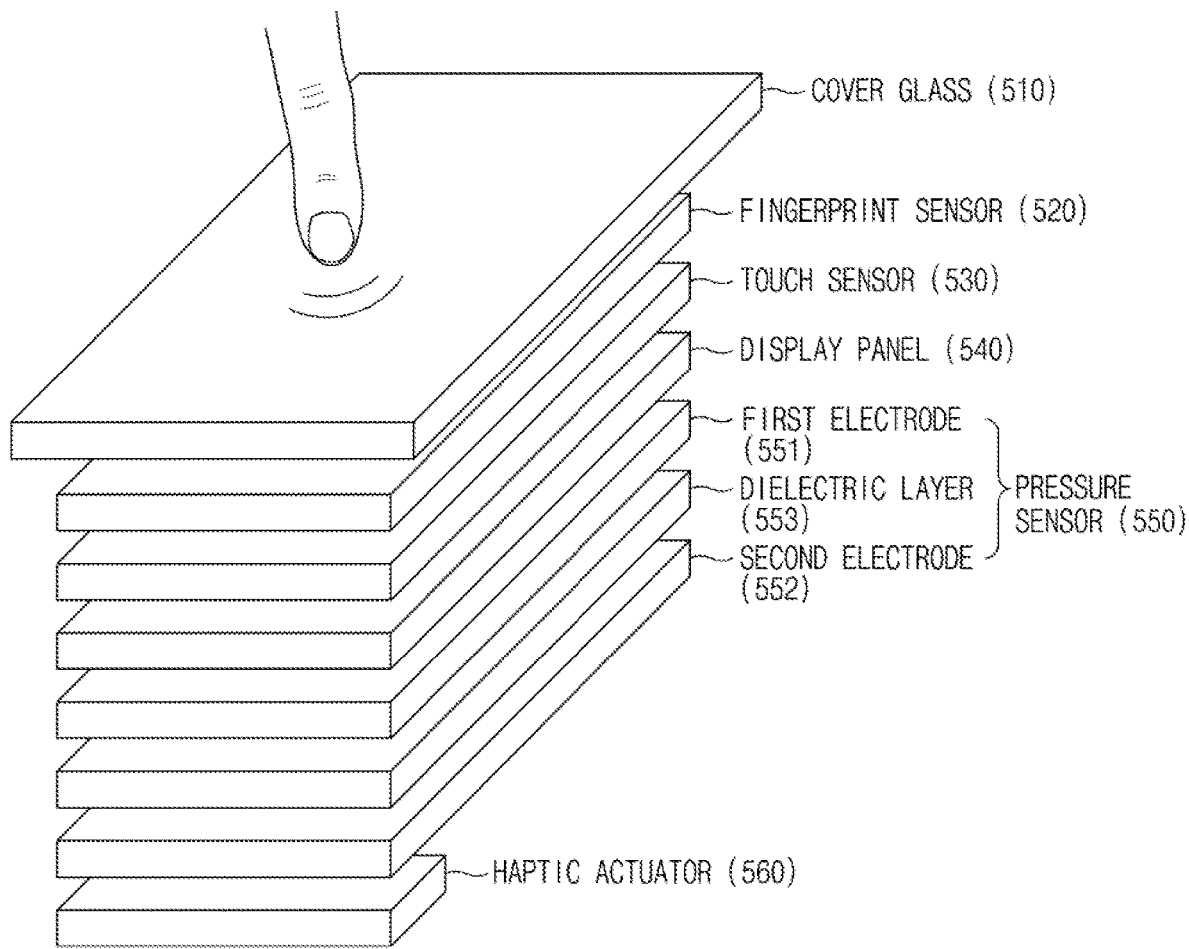
FIGS. 5A and 5B are views illustrating a stacked structure of a display according to various embodiments of the present disclosure.
Figure 5B:
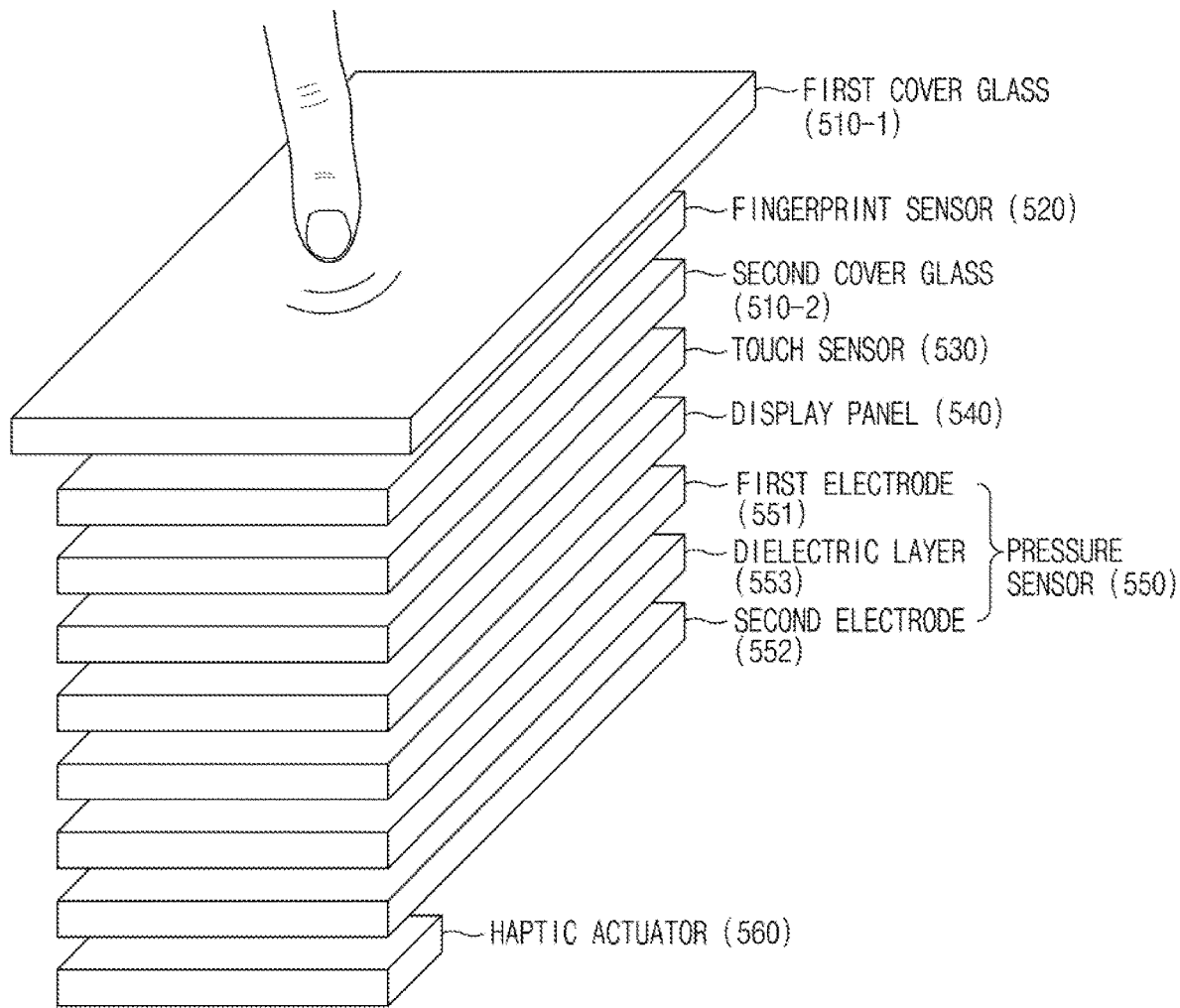

FIGS. 5A and 5B are views illustrating a stacked structure of a display according to various embodiments of the present disclosure.

Referring to FIG. 5A, the stacked structure of the display according to an embodiment is illustrated. For example, the stacked structure may be applied to the display 320 illustrated in FIG. 3.

In the stacked structure of a display according to an embodiment, a cover glass 510 (or a cover window) may be disposed in an internal space between a front surface (a first surface) of an electronic device (or a housing) and a rear surface (a second surface) of the electronic device. The cover glass 510 may be exposed through the front surface (the first surface) of the electronic device but may transmit light generated by a display panel 540. A user may perform a touch input on the cover glass 510 by contacting the cover glass 510 by using a portion of a body (e.g., a finger) or an intermediary device (e.g., a stylus, an electronic pen, etc.). For example, the cover glass 510 may protect the display and the electronic device, in which the display is mounted, from external impact by being formed of tempered glass, reinforced plastics, a flexible polymer material, or the like.

According to various embodiments, the cover glass 510 may be also referred to a glass window or a cover window.

For example, a fingerprint sensor 520 may be disposed in the internal space between the front surface (the first surface) of the electronic device, in which the cover glass 510 is disposed, and the rear surface (the second surface) of the electronic device. For example, the fingerprint sensor 520 may be disposed between the cover glass 510 and a touch sensor 530. The fingerprint sensor 520 may sense a fingerprint of the finger of the user from at least a part of a surface (i.e., a surface of the cover glass 510) of the display.

For example, the fingerprint sensor 520 may include caps, which are composed of an array of a plurality of capacitors, and may sense the fingerprint of the finger. As another example, the fingerprint sensor 520 may include light receiving sensors each of which receives light reflected from the display panel 540, and may sense the fingerprint of the finger. In this case, because the image of the fingerprint that is input to a fingerprint sensing module is distorted due to the diffraction of light by an irregular hole of the display panel 540, a pin hole layer may be further provided between the display panel 540 and the fingerprint sensor 520. The pin hole layer may allow the fingerprint sensor 520 to obtain the fingerprint image with reduced distortion by reducing the diffraction of light that is reflected from the display panel 540. As another example, the fingerprint sensor 520 may include a piezoelectric film and may sense the fingerprint of the finger in the ultrasonic manner.

For example, the touch sensor 530 may be disposed in the internal space between the front surface (the first surface) of the electronic device, in which the cover glass 510 is disposed, and the rear surface (the second surface) of the electronic device. In the touch sensor 530, a specified physical quantity (e.g., voltage, light intensity, resistance, charge amount, capacitance, or the like) may be changed by the touch from the user. For example, the touch sensor 530 may include a capacitive touch panel, a pressure-sensitive touch panel, an infrared touch panel, a resistive touch panel, a piezoelectric touch panel, or the like. According to various embodiments, the touch sensor 530 may be referred to as various names such as a touch panel and the like based on the implemented form.

According to various embodiments, the display panel 540 may output content (e.g., a text, an image, a video, an icon, a widget, a symbol, or the like). For example, the display panel 540 may include an LCD panel, an LED display panel, an organic LED (OLED) display panel, a MEMS display panel, or an electronic paper display panel.

According to various embodiments, the display panel 540 may be integrated with the touch sensor 530 (or the touch panel). In this case, the display panel 540 may be also referred to a touch screen panel (TSP) or a touch screen display panel.

A pressure sensor 550 may be disposed in the internal space between the front surface (the first surface) of the electronic device, in which the cover glass 510 is disposed, and the rear surface (the second surface) of the electronic device. The pressure sensor 550 may sense (or detect) pressure (i.e., a force) that is applied from the outside (e.g., the finger of the user) against the cover glass 510. According to an embodiment, the pressure sensor 550 may include a first electrode 551, a second electrode 552, and/or a dielectric layer 553. For example, the pressure sensor 550 may sense the pressure of the touch based on the capacitance between the first electrode 551 and the second electrode 552.

According to an embodiment, the first electrode 551 and/or the second electrode 552 may be implemented to be transparent or opaque. For example, when the first electrode 551 and/or the second electrode 552 is implemented to be opaque, the first electrode 551 and/or the second electrode 552 may be implemented with copper (Cu), silver (Ag), magnesium (Mg), titanium (Ti), or an opaque graphene. In addition, when the first electrode 551 and/or the second electrode 552 are implemented to be transparent, the first electrode 551 and/or the second electrode 552 may be implemented with indium tin oxide (ITO), indium zinc oxide (IZO), a silver nanowire, a metal mesh, a transparent polymer conductor, or a transparent graphene.

For example, one of the first electrode 551 and/or the second electrode 552 may be implemented with one metal plate that performs a role of an electrical ground GND, and the other thereof may be formed in the repeated polygon pattern by using the above-mentioned member (i.e., a self-capacitance manner). As another example, one (e.g., a transmitter Tx) of the first electrode 551 and the second electrode 552 may be formed of a pattern extending in a first direction, and the other (e.g., a receiver Rx) thereof may be formed of a pattern extending in a second direction that intersects with the first direction at a specified angle (e.g., a right angle) (i.e., a mutual-capacitance).

The dielectric layer 553 may be implemented with a dielectric material, for example, a silicon foam, a silicon membrane, an optical clean adhesive (OCA), a sponge, a rubber, or a polymer (e.g., polycarbonate (PC), polyethylene terephthalate (PET), or the like).

According to various embodiments, when a touch input (including a touch, hovering, or a "force touch") is received from a user, the haptic actuator 560 may provide the user with haptic feedback (e.g., vibration). To this end, the haptic actuator 560 may include a piezoelectric member and/or a vibration plate.

A layer that includes a fingerprint processing processor (e.g., a fingerprint sensor IC), a touch processing processor (e.g., a touch sensor IC), a display processing processor (e.g., a DDI), and a pressure processing processor (e.g., a pressure sensor IC) may be located between each of layers of the stacked structure of FIG. 5A. For example, the layer may be located between the display panel 540 and the pressure sensor 550. Alternatively, each of processors may be located at a part of the layer associated with the processor. For example, the fingerprint processing processor may be located at a layer in which the fingerprint sensor 520 is included, the touch processing processor may be located at a layer in which the touch sensor 530 is included, the display processing processor may be located at a layer in which the display panel 540 is included, and the pressure processing processor may be located at a layer in which the pressure sensor 550 is included.

Referring to FIG. 5B, as another example, the stacked structure of the display may include a plurality of cover glasses 510-1 and 510-2. The second cover glass 510-2 may be added in the stacked structure to enhance the stiffness of the stacked structure and may be located between the fingerprint sensor 520 and the touch sensor 530.

The above-described stacked structure of the display of FIG. 5A or 5B are examples and may be variously changed. For example, the touch sensor 530 may be directly formed on the rear surface of the cover glass 510 (i.e., a touch panel integrated with a cover glass), may be separately manufactured and may be inserted between the cover glass 510 and the display panel 540 (i.e., an add-on touch panel), may be directly formed on the display panel 540 (so-called, an on-cell touch panel), or may be included in the display panel 540 (i.e., an in-cell touch panel). According to various embodiments, the first electrode 551 of the pressure sensor 550 may be formed on a circuit board (e.g., a FPCB) and may be attached to the display panel 540, or the first electrode 551 of the pressure sensor 550 may be directly formed on the rear surface of the display panel 540. In addition, when the fingerprint sensor 520 is implemented to be opaque, the fingerprint sensor 520 may be disposed on the rear surface of the display panel 540.

Figure 6A:
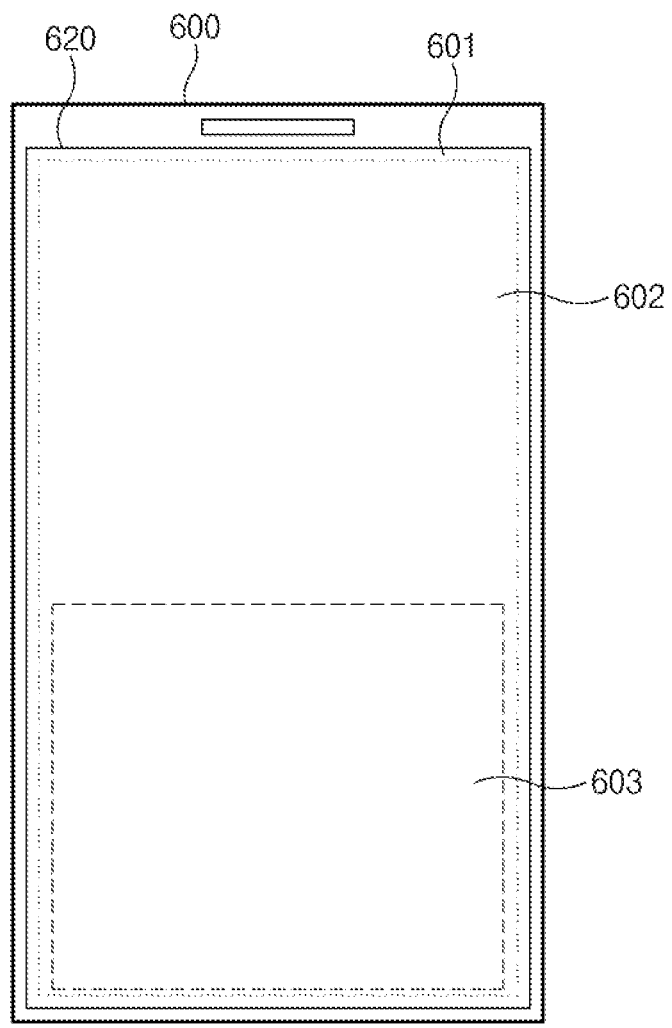
FIGS. 6A and 6B are views illustrating a screen area of a display included in an electronic device according to various embodiments of the present disclosure.
Figure 6B:
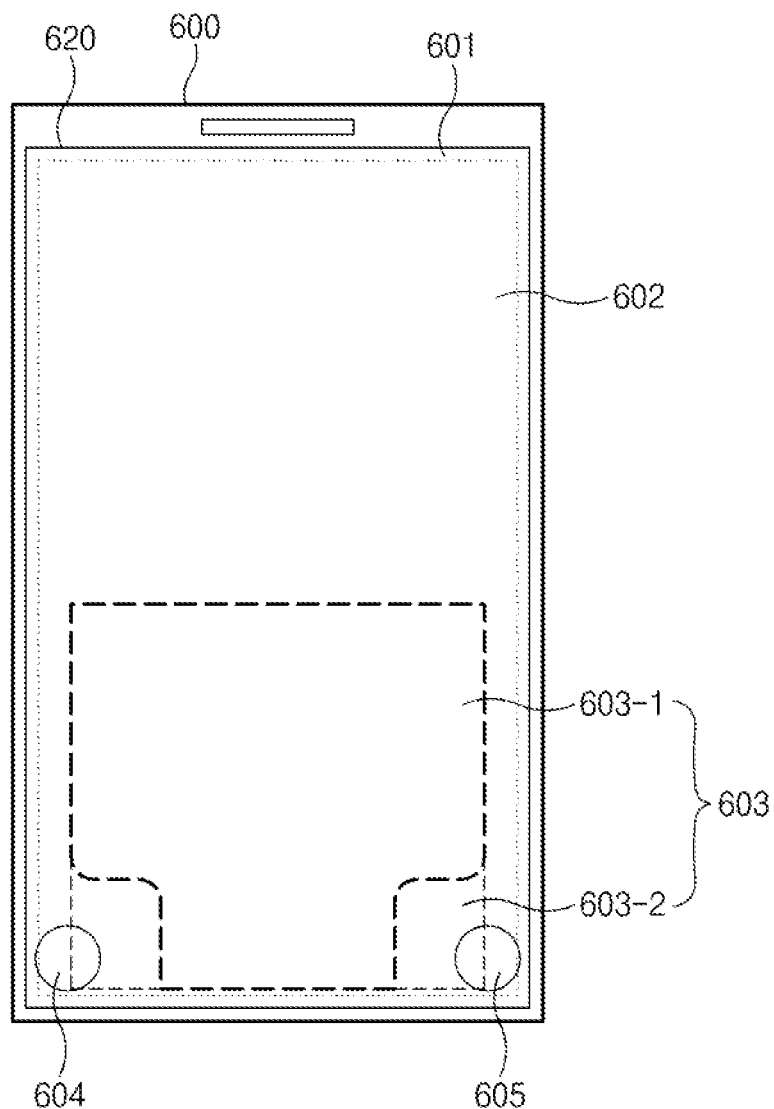

FIGS. 6A and 6B are views illustrating a screen area of a display included in an electronic device according to various embodiments of the present disclosure.

Referring to FIG. 6A, a display 620 included in an electronic device 600 (e.g., the electronic device 401 of FIG. 4) may include a screen area 601 in which a screen is displayed. The screen area 601 may be an area in which visual information is displayed or in which visual information is to be displayed.

According to various embodiments, at least a part of a pressure sensing area 602 may overlap with at least a part of an area of the display 620. For example, a part of the pressure sensing area 602 may overlap with all or most of the screen area 601. For example, the pressure sensing area 602 may overlap with at least 80% of the screen area 601.

According to various embodiments, if the pressure by an external object (e.g., a finger of a user) is applied to the pressure sensing area 602, a pressure sensor (e.g., the pressure sensor 430 of FIG. 4) may generate pressure data associated with the sensed pressure. In addition, the pressure sensor may transmit the pressure data associated with the generated pressure to a processor (e.g., the processor 470 of FIG. 4).

According to various embodiments, at least a part of a fingerprint sensing area 603 may overlap with the screen area 601. For example, the fingerprint sensing area 603 may overlap with at least 3.33% (i.e., ⅟30$^{th}$) of the screen area 601. As another example, the fingerprint sensing area 603 may overlap at least 3.33% of the screen area and less than half of the screen area 601. As another example, the fingerprint sensing area 603 may overlap with the whole screen area 601. As another example, when described with reference to FIG. 3, the fingerprint sensing area 603 may be closer to the third periphery 313 than the first periphery 311, with reference to the first surface 315 of FIG. 3.

According to various embodiments, the electronic device 600 may determine the display location of application identification information (e.g., an application icon or an application name) based on a type (or an attribute) of an application. For example, the electronic device 600 may display the application identification information of an application, when a lock function is set, in an area overlapping with the fingerprint sensing area 603. The electronic device 600 may display the application identification information of an application, when the lock function is not set, in an area which does not overlap with the fingerprint sensing area 603.

For example, the application (or a lock function setting application) with respect to which the lock function is set may refer to an application which is performed through authentication (e.g., fingerprint recognition, password input, or the like) or of which a part of the function is performed through the authentication. For example, the application (or a lock function unsetting application) with respect to which the lock function is not set may be an application which is performed without the separate authentication or of which all functions are performed without the separate authentication.

According to various embodiments, if the touch or the pressure by the finger of a user is applied to the fingerprint sensing area 603, a fingerprint sensor may generate fingerprint data associated with the sensed fingerprint. For example, the fingerprint sensor may transmit the fingerprint data associated with the generated fingerprint to the processor.

FIG. 6B is a view illustrating a screen area of a display included in the electronic device according to another embodiment of the present disclosure.

Referring to FIG. 6B, a partial area of the screen area 601 may overlap with at least a part of the pressure sensing area 602 and/or the fingerprint sensing area 603. According to an embodiment, at least a part of the fingerprint sensing area 603 may operate as a fingerprint unavailable area 603-2 where it impossible to process data of a fingerprint based on a mode of the electronic device 600. For example, the fingerprint sensing area 603 may be divided into a fingerprint available area 603-1 in which data of the fingerprint is processed and the fingerprint unavailable area 603-2 in which data of the fingerprint is not processed based on the mode of the electronic device 600. For example, the mode of the electronic device 600 may include a lock screen mode or an unlock mode. As another example, the mode of the electronic device 600 may include a sleep mode or a wakeup mode. In this case, data associated with the fingerprint may not be sensed because the fingerprint unavailable area 603-2 is deactivated. Alternatively, the electronic device 600 may ignore data of the received fingerprint when the data of the fingerprint is received in response to a touch or pressure on or against the fingerprint unavailable area 603-2. As another example data associated with the fingerprint may not be processed because the electronic device 600 remains in a current state in response to the touch or the pressure on or against the fingerprint unavailable area 603-2.

For example, when the mode of the electronic device 600 is in a locked screen mode, the fingerprint unavailable area 603-2 may include a part of areas 604 and 605 in which identification information (e.g., an application icon, an application name, or the like) of a specific application is displayed in the lock screen mode.

In this case, the specific application may be an application installed by a manufacturer of the electronic device 600, a provider of an application, or a provider of an OS, and may be, for example, an emergency call application that includes a list of urgent contacts that the user uses in an emergency situation or makes a call to an urgent contact, a camera application that is not related to personal information of the user, or the like. Alternatively, the specific application may be an application that is set such that an icon is displayed for the user to use even in the lock screen mode at any time.

According to an embodiment, a type of an application or a display location, a size, or the like of application identification information, or the like that is displayed in the fingerprint unavailable area 603-2 may be changed according to context information (e.g., application execution history). For example, the electronic device 600 may display the application identification information of the application that is most recently (or within a specified time period) executed through fingerprint recognition. As another example, the electronic device 600 may change the size of the application identification information based on the execution frequency of the application. According to an embodiment, the type of an application or the display location, the size, or the like of application identification information that is displayed in the fingerprint unavailable area 603-2 may be changed according to a user input.

According to an embodiment, the location or the size of the fingerprint available area 603-1 and the fingerprint unavailable area 603-2 may be changed according to information displayed in the screen area 601. For example, the electronic device 600 may set an area corresponding to identification information of an application necessary for the fingerprint recognition, as the fingerprint available area 603-1. The electronic device 600 may set an area corresponding to the identification information of an application which is not necessary for the fingerprint recognition, as the fingerprint unavailable area 603-2.

FIGS. 7A, 7B, 7C, 7D, 7E, 8A, 8B, 8C, 8D, 9A, 9B, 10A, 10B, 11A, 11B, 11C, 12A, and 12B are views illustrating use of an electronic device according to various embodiments of the present disclosure.

Referring to FIGS. 7A, 7B, 7C, 7D, and 7E various view are illustrated in which a function of an electronic device 700 is executed.

The electronic device 700 may selectively perform functions of the electronic device 700 when pressure is applied by a finger against a user interface (UI) area 711 or 721 included in a screen area 701 or while the UI area 711 or 721 is touched by the finger. At least a part of the UI area 711 or the UI area 721 may include a pressure sensing area 702 and/or a fingerprint sensing area 703 that overlaps at least partially, and may be an area in which identification information of an application capable of being executed by the electronic device 700 is displayed.

Figure 7A:
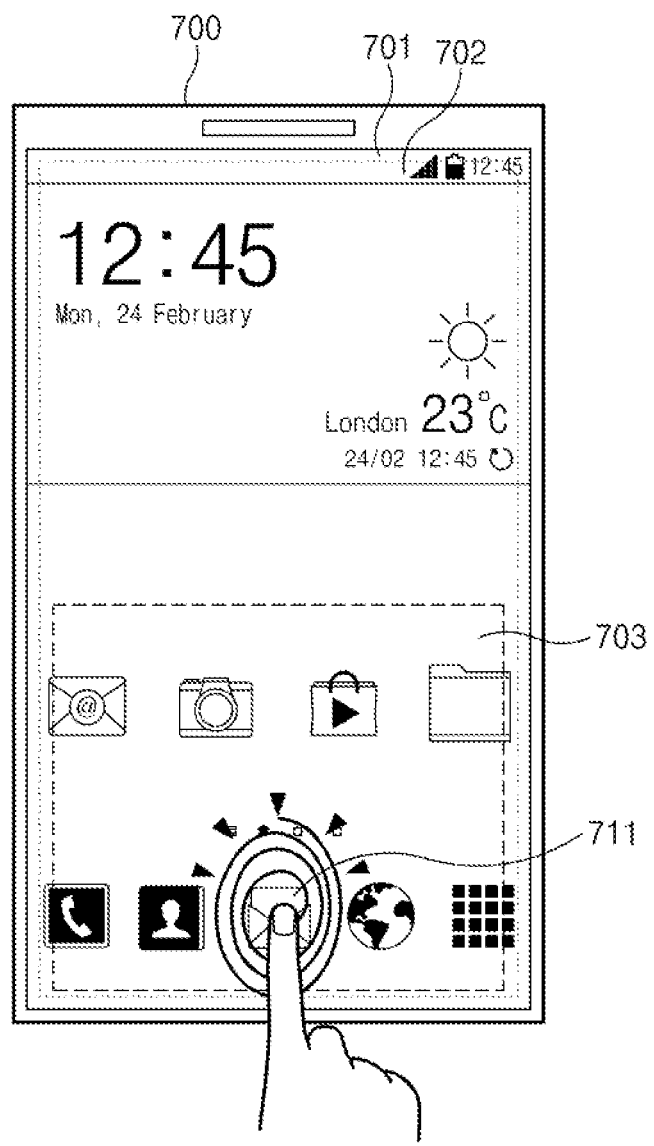
FIGS. 7A, 7B, 7C, 7D, 7E, 8A, 8B, 8C, 8D, 9A, 9B, 10A, 10B, 11A, 11B, 11C, 12A, and 12B are views illustrating use of an electronic device according to various embodiments of the present disclosure.

Referring to FIG. 7A, a user may touch the UI area 711 by using the finger. The electronic device 700 may sense pressure by the finger of the user against at least a part of the UI area 711. If the pressure by the finger is applied to the UI area 711, the electronic device 700 may obtain pressure data by using a pressure sensor and may obtain fingerprint data associated with the fingerprint by using a fingerprint sensor.

When the pressure data of specified intensity or more is obtained, the electronic device 700 may start obtaining the fingerprint data of the fingerprint by using the fingerprint sensor. When fingerprint recognition begins, the electronic device 700 may display a UI associated with the fingerprint recognition. For example, the electronic device 700 may display a UI for guiding the user or a UI indicating that the fingerprint recognition is being performed. As another example, the electronic device 700 may display a UI that allows the user to maintain the pressure of the finger that is suitable for the fingerprint recognition (e.g., a UI that allows the user to lower pressure in the case where the user performs a touch operation with excessive pressure).

Figure 7B:
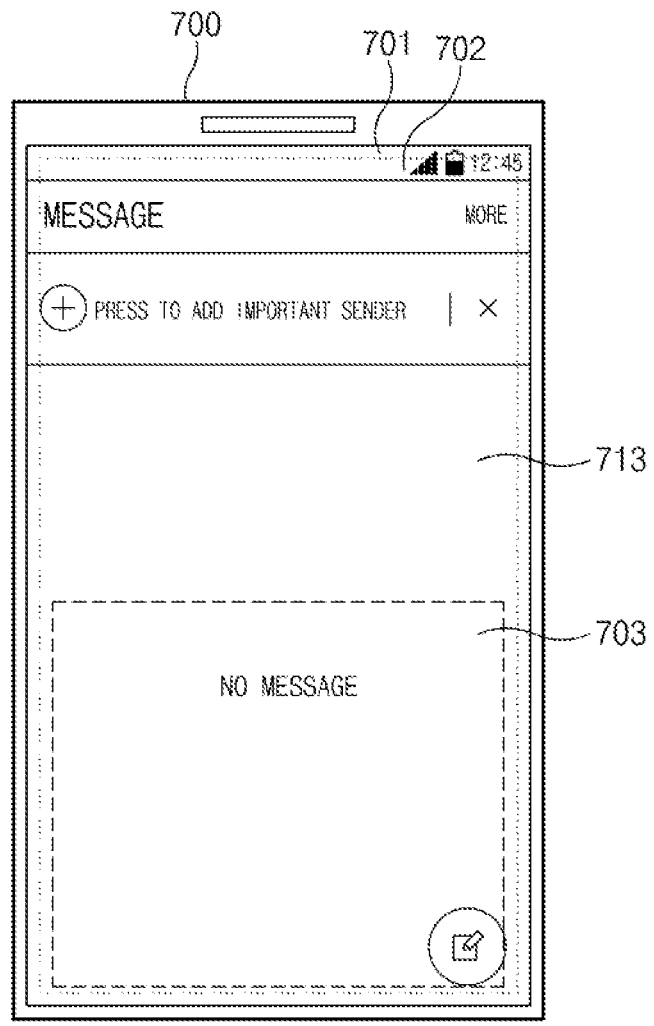

If the fingerprint data is obtained, the electronic device 700 may compare the obtained fingerprint data with reference fingerprint data of reference fingerprints that are stored in a memory. When the result indicates that the obtained fingerprint data and the reference fingerprint data match, the electronic device 700 may perform a specified operation. For example, as illustrated in FIG. 7B, the electronic device 700 may display an execution screen 713 of an application corresponding to the touched UI area 711.

When the result of the comparison indicates that the obtained fingerprint data and the reference fingerprint data do not match, for example, the electronic device 700 may display a UI for providing notification that the fingerprint recognition fails.

According to an embodiment, the electronic device 700 may deactivate the fingerprint sensor before a touch of the user or pressure by the touch is sensed, and may activate the fingerprint sensor if the touch of the user or the pressure by the touch is sensed. For example, if touch coordinates are obtained by the touch sensor or if the pressure data of specified intensity or more is received by the pressure sensor, the electronic device 700 may activate the fingerprint sensor. If the obtaining of the fingerprint data is completed or if the comparing of the fingerprint data with the reference fingerprint data is completed, the electronic device 700 may deactivate the fingerprint sensor again.

If the finger of the user is touched in the fingerprint unavailable area, the electronic device 700 may temporarily change the area into the fingerprint available area in which the data associated with the fingerprint is processed. If the area where the finger of the user is touched is changed into the fingerprint available area, the electronic device 700 may display a UI indicating that the corresponding area is changed into the fingerprint available area.

Figure 7C:
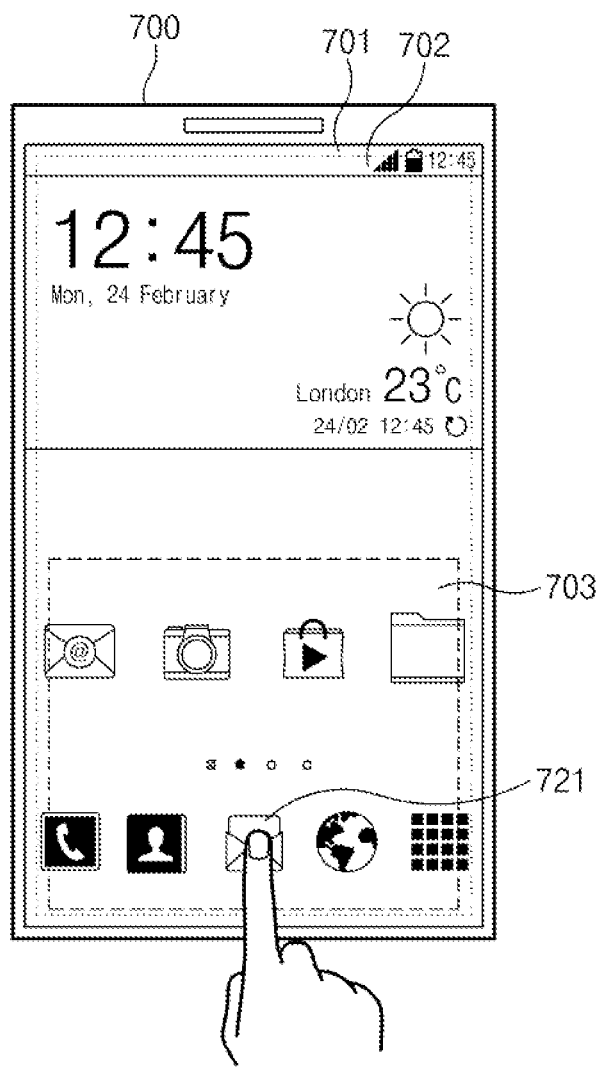

Referring to FIG. 7C, the user may touch the UI area 721 included in the screen area 701 by using the finger. The electronic device 700 may sense pressure by the finger of the user against at least a part of the UI area 721. If the pressure by the finger is applied to the UI area 721, the electronic device 700 may obtain pressure data by using the pressure sensor.

Figure 7D:
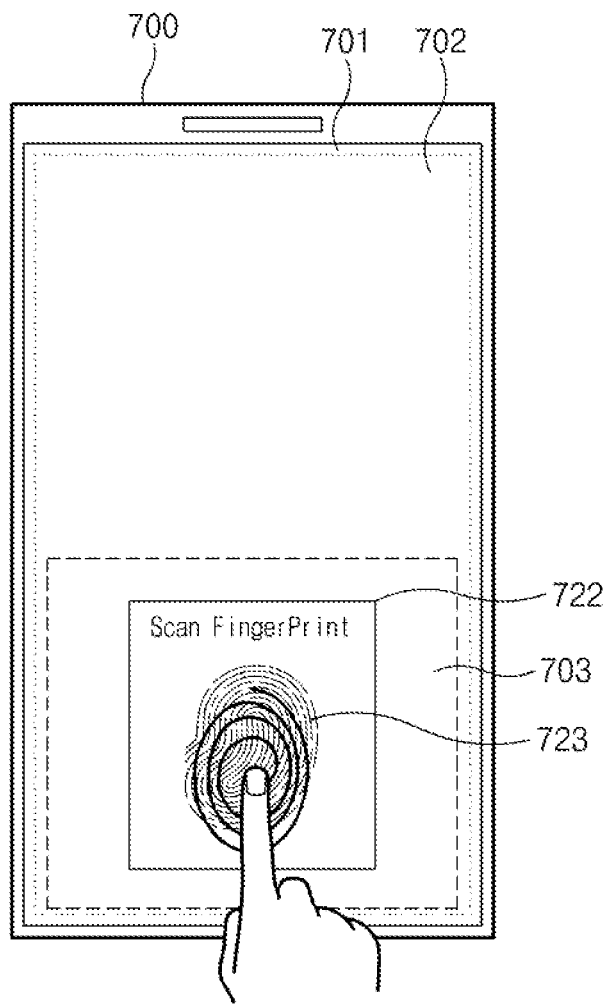

If the user touches the UI area 721, as illustrated in FIG. 7D, the electronic device 700 may display a fingerprint recognition requesting UI 722 in the screen area 701. For example, the fingerprint recognition requesting UI 722 may be displayed in a screen in the form of a pop-up UI. According to an embodiment, if pressure intensity corresponding to pressure data is not less than specified intensity, the electronic device 700 may display the fingerprint recognition requesting UI 722 in the screen.

In 'FIG. 7D, the user may touch a part 723 of a fingerprint sensing area 703 by using the finger with reference to the displayed fingerprint recognition requesting UI 722. While the user touches the part 723 of the fingerprint sensing area 703, the electronic device 700 may obtain the fingerprint data associated with the fingerprint by using the fingerprint sensor.

Figure 7E:
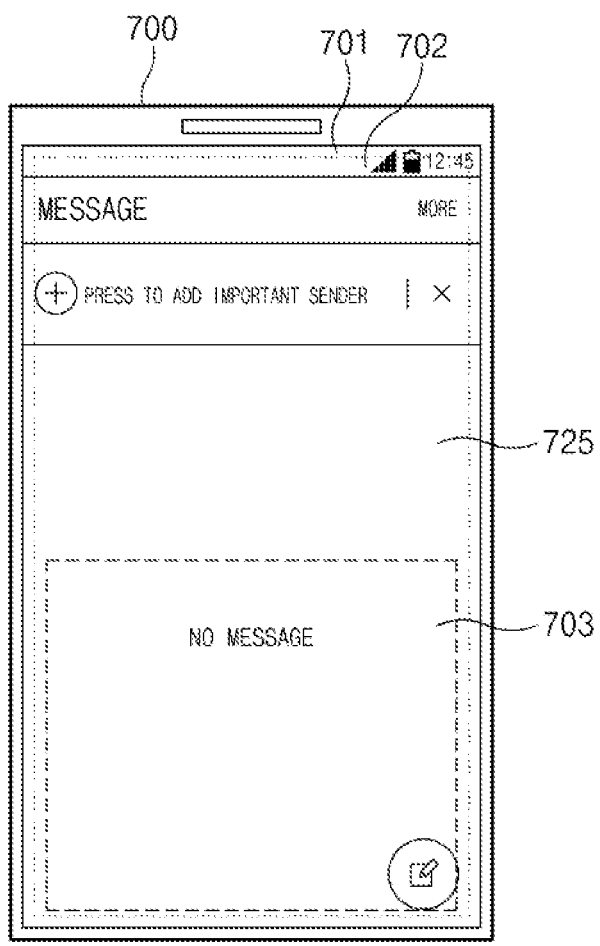

According to various embodiments, if the fingerprint data is received, the electronic device 700 may compare the obtained fingerprint data with reference fingerprint data. When the comparison result indicates that the obtained fingerprint data and the reference fingerprint data match, the electronic device 700 may perform a specified operation. For example, as illustrated in FIG. 7E, the electronic device 700 may display an execution screen 725 of an application corresponding to the touched UI area 721 in the screen area 701.

FIGS. 8A, 8B, 8C, and 8D are views in which one of a plurality of functions of the electronic device is performed according to another embodiment of the present disclosure.

Referring to FIGS. 8A, 8B, 8C, and 8D, while pressure (or pressure specified intensity or more) by a finger is applied to a UI area 811 or while the UI area 811 is touched by the finger, an electronic device 800 may selectively perform functions of the electronic device 800. At least a part of the UI area 811 or 821 may be an area where a pressure sensing area 802 and/or a fingerprint sensing area 803 overlap. For example, the UI area 811 or 821 may be an area in which a folder icon (or an application list displaying icon) for providing a list of applications is displayed. The list of applications may be a list including pieces of identification information (e.g., an application name and an icon of an application) of the applications. A part of applications included in the application list may be a lock function setting application with respect to which the lock function is set.

Figure 8A:
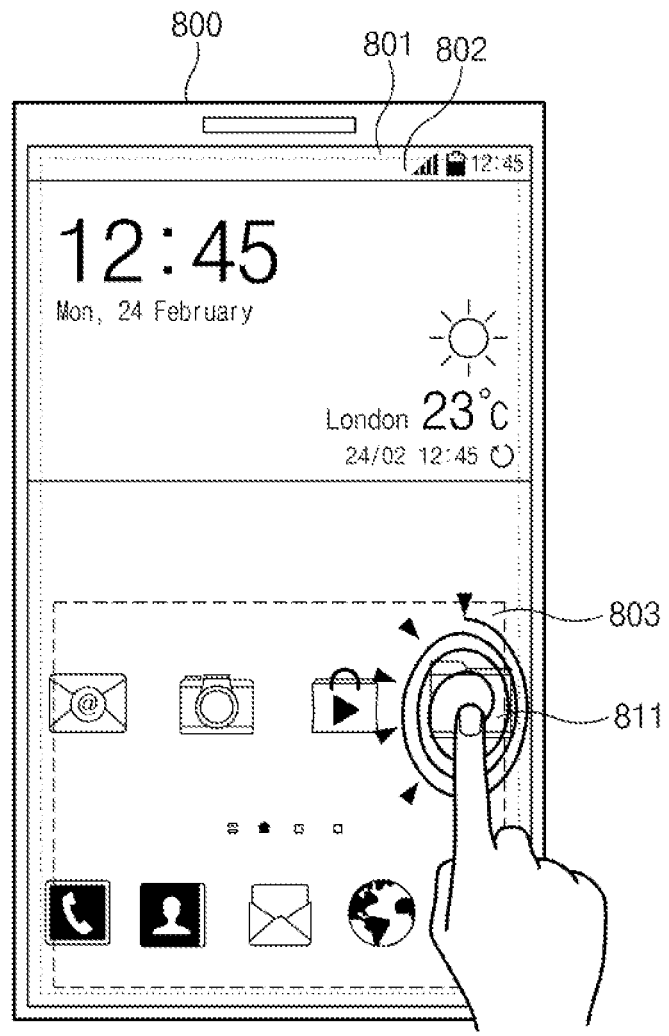
Figure 8B:
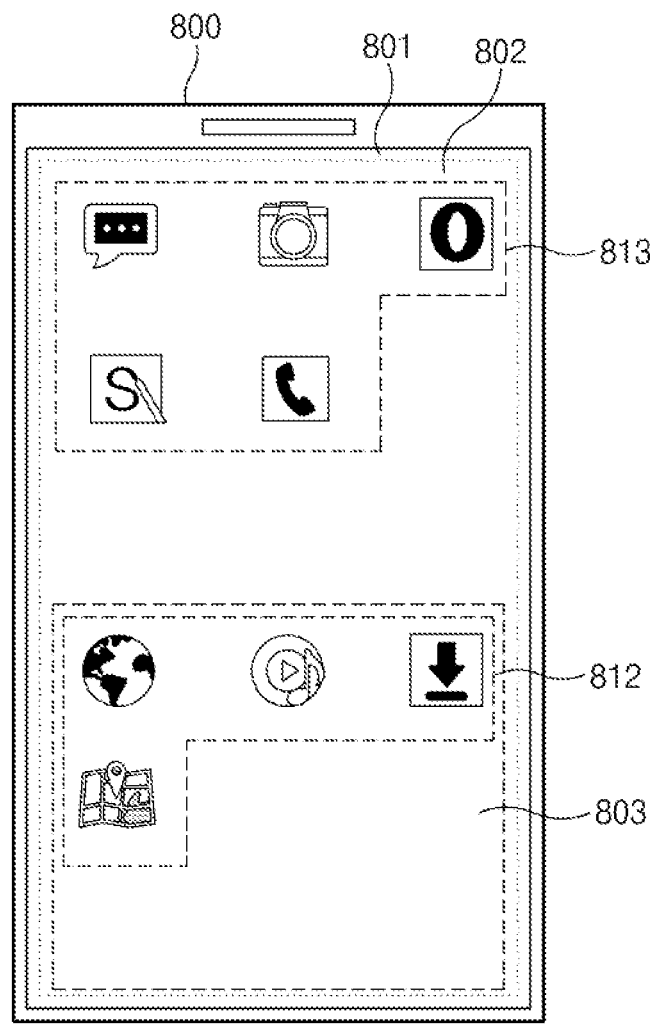

In FIG. 8A, a user may touch the UI area 811 included in the screen area 801 by using the finger. According to an embodiment, the UI area 811 may be an area in which the pressure sensing area 802 and the fingerprint sensing area 803 overlap with each other. The electronic device 800 may sense pressure by the finger of the user against at least a part of the UI area 811. While the pressure by the finger is applied to the UI area 811, the electronic device 800 may obtain pressure data by using a pressure sensor and may obtain fingerprint data associated with the fingerprint by using a fingerprint sensor. If the fingerprint data is obtained, the electronic device 800 may compare the obtained fingerprint data with reference fingerprint data of reference fingerprints stored in a memory of the electronic device 800. When the comparison result indicates that the obtained fingerprint data with reference fingerprint data match, the electronic device 800 may display the application list in a screen. For example, as illustrated in FIG. 8B, the electronic device 800 may display both a list 812 of lock function setting applications and a list 813 of lock function unsetting applications in the screen. According to an embodiment, the electronic device 800 may display the list 812 of the lock function setting applications in an area corresponding to a fingerprint sensing area.

Figure 8C:
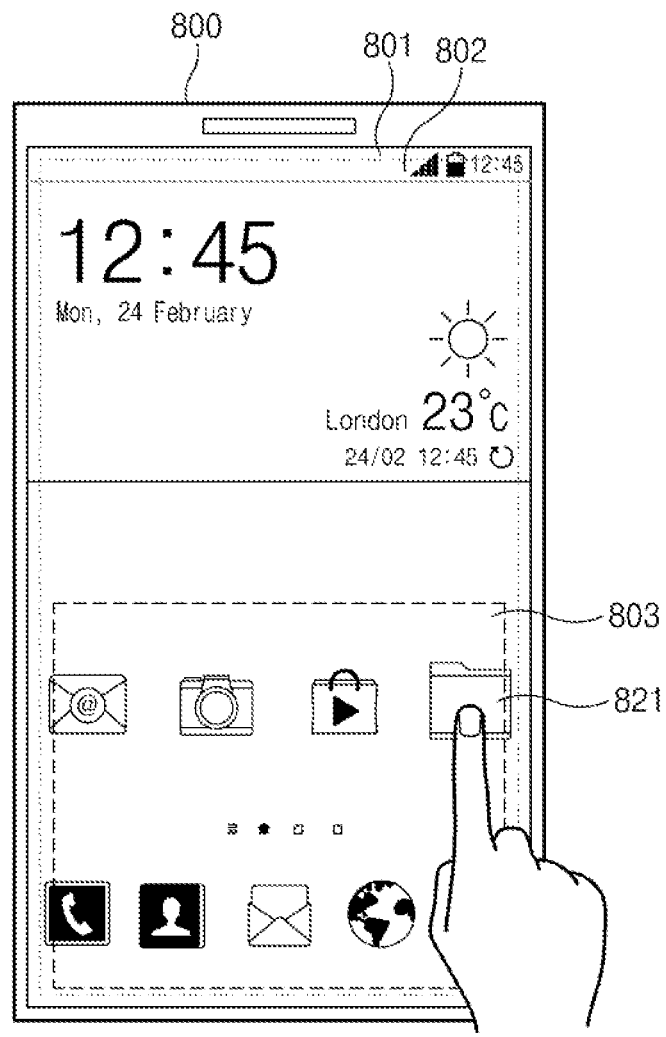

Referring to FIG. 8C, a user may touch the UI area 821 included in the screen area 801 by using the finger. According to an embodiment, the UI area 821 may be an area in which the pressure sensing area 802 and the fingerprint sensing area 803 overlap with each other. Even though the user touches the UI area 821, the electronic device 800 may not perform fingerprint recognition or may fail to recognize the fingerprint. For example, when the UI area 821 is not located in the fingerprint sensing area, the electronic device 800 may not perform the fingerprint recognition. As another example, if the electronic device 800 does not obtain fingerprint data because the user does not touches for a sufficient time or if the obtained fingerprint data does not match any reference fingerprint data, the electronic device 800 may fail to recognize the fingerprint.

Figure 8D:
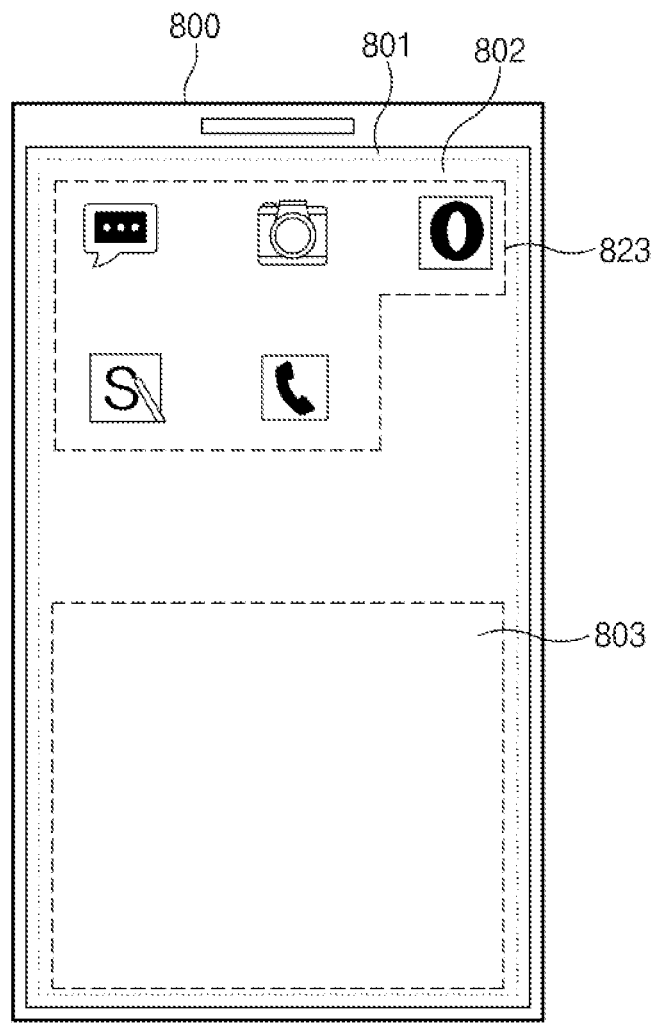

Referring to FIG. 8D, when the electronic device 800 does not perform fingerprint application or when the electronic device 800 fails to authenticate the fingerprint, the electronic device 800 may display only the list 823 of the lock function unsetting applications other than the list of the lock function setting applications in the screen.

Figure 9A:
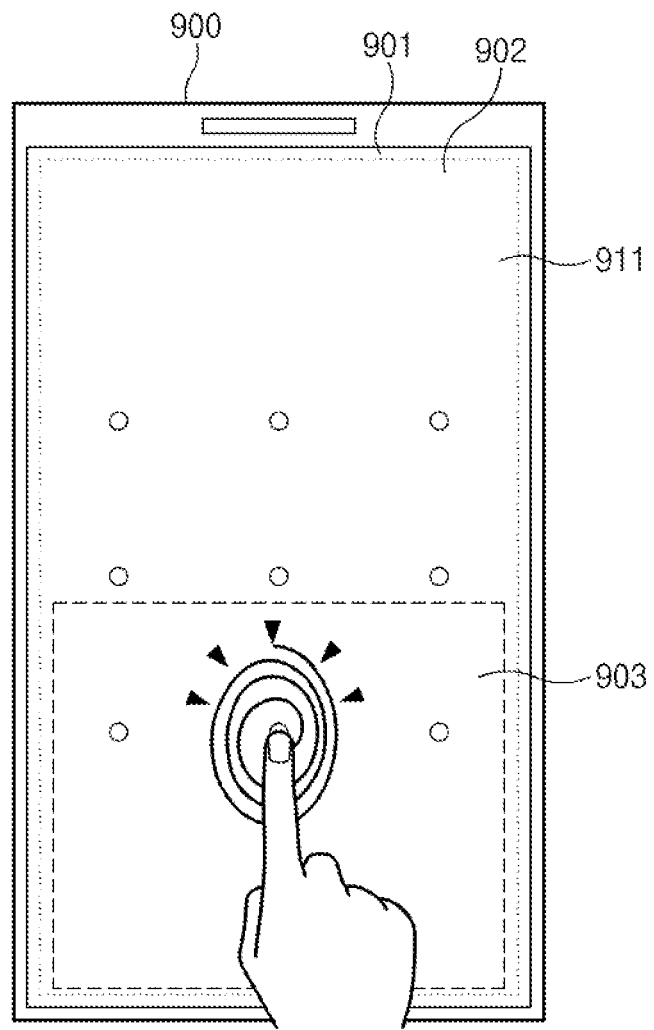
Figure 9B:
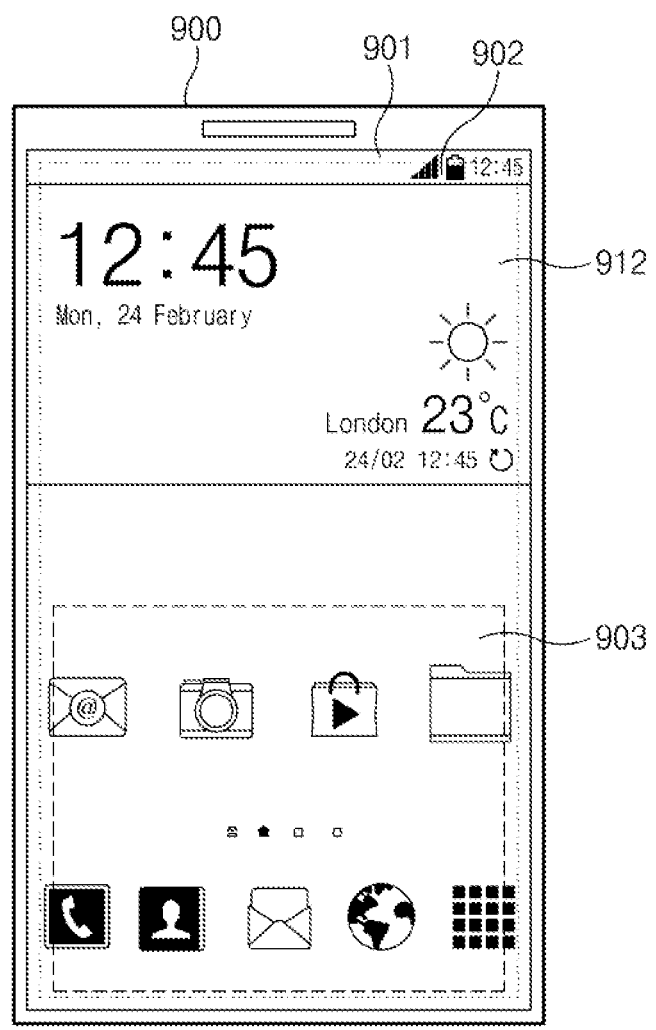

FIGS. 9A and 9B are views in which a function to release a lock screen of an electronic device is executed according to an embodiment of the present disclosure.

Referring to FIG. 9A, a mode of an electronic device 900 may be a lock screen mode for providing a lock screen 911 to a screen area 901. While the electronic device 900 is in the lock screen mode, a user may apply pressure to a part of the screen area 901 by using a finger. In this case, the part of the screen area 901 may be an area in which a pressure sensing area 902 and a fingerprint sensing area 903 overlap with each other.

According to various embodiments, while the pressure by the finger is applied to the part of the screen area 901, the electronic device 900 may obtain pressure data by using a pressure sensor and may obtain fingerprint data associated with the fingerprint by using a fingerprint sensor. If the fingerprint data is obtained, the electronic device 900 may compare the obtained fingerprint data with reference fingerprint data of reference fingerprints stored in a memory of the electronic device 900. When the comparison result indicates that the obtained fingerprint data with reference fingerprint data match, the electronic device 900 may change a screen mode from the lock screen mode to an unlock mode. As such, as illustrated in FIG. 9B, the electronic device 900 may display an unlock screen 912. An example of the unlock screen 912 may be a main home screen.

According to an embodiment, the electronic device 900 may display the unlock screen 912 based on intensity of the pressure data. For example, if the pressure data of a first intensity is obtained, the electronic device 900 may display the main home screen. If the pressure data of a second intensity is obtained, the electronic device 900 may display an execution screen of a specific application (e.g., a camera application). As another example, if the pressure data of first intensity is obtained, the electronic device 900 may display a first home screen. If the pressure data of second intensity is obtained, the electronic device 900 may display a second home screen. As another example, if the pressure data of first intensity is obtained, the electronic device 900 may execute a first operation of the first application. If the pressure data of second intensity is obtained, the electronic device 900 may execute a second operation of the second application. As another example, if the pressure data of first intensity is obtained, the electronic device 900 may display a home screen. If the pressure data of second intensity is obtained, the electronic device 900 may execute an operation associated with an event that the electronic device 900 receives.

Figure 10A:
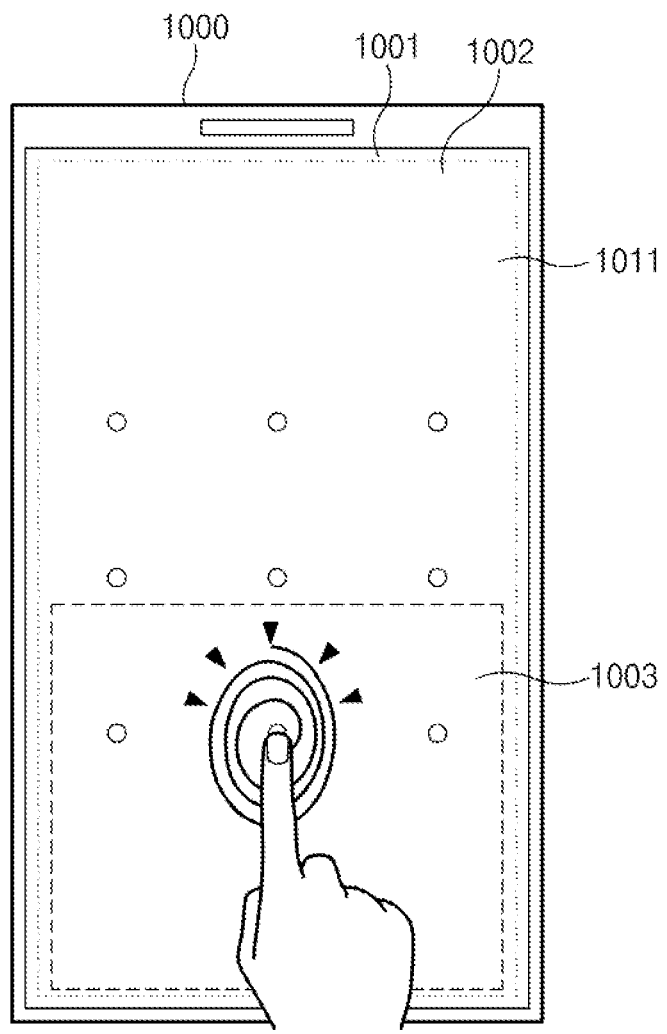
Figure 10B:
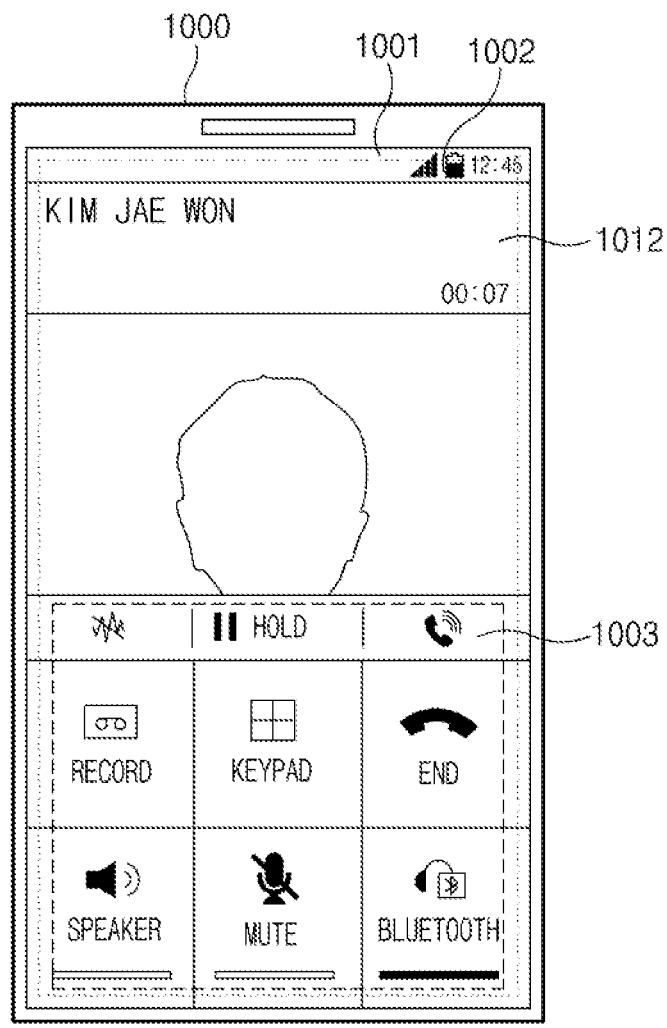

FIGS. 10A and 10B are views in which a lock screen of an electronic device is released according to another embodiment of the present disclosure.

Referring to FIG. 10A, an electronic device 1000 may be in a lock screen mode and display a lock screen 1011. While the electronic device 1000 operates in the lock screen mode, a user may apply pressure to a part of a screen area 1001 by using one of a plurality of fingers. In this case, the part of the screen area 1001 may be an area in which a pressure sensing area 1002 and a fingerprint sensing area 1003 overlap with each other. While the pressure by the finger is applied to the part of the screen area 1001, the electronic device 1000 may obtain pressure data by using a pressure sensor and may obtain fingerprint data associated with the fingerprint by using a fingerprint sensor.

If the fingerprint data is received, the electronic device 1000 may execute a function that is mapped to the received fingerprint data. If the fingerprint data is received, the electronic device 1000 may compare the received fingerprint data with reference fingerprint data stored in a memory of the electronic device 1000. Each reference fingerprint data may be pieces of data associated with one of a plurality of fingers of the user.

In this case, the electronic device 1000 may determine reference fingerprint data, which is matched to the obtained fingerprint data, from among the pieces of reference fingerprint data. For example, the electronic device 1000 may determine whether the reference fingerprint data that matches the received fingerprint data is reference fingerprint data associated with the thumb, the index finger, or the middle finger. If the reference fingerprint data matched to the fingerprint data is determined, the electronic device 1000 may perform a function of the electronic device 1000 corresponding to the determined reference fingerprint data.

For example, the electronic device 1000 may initiate a voice call to a destination corresponding to one shortcut key by executing a call application, as a function corresponding to the reference fingerprint data associated with the index finger. In this case, as illustrated FIG. 10B, the electronic device 1000 may display an execution screen 1012 of the call application that makes a call to a destination.

As another example, the electronic device 1000 may execute a social network service (SNS) application as a function corresponding to the reference fingerprint data associated with the thumb. As another example, the electronic device 1000 may execute a messenger application as a function corresponding to the reference fingerprint data associated with the middle finger.

According to an embodiment, a plurality of functions may be mapped to the reference fingerprint data associated with one finger based on intensity corresponding to pressure data. For example, if the obtained fingerprint data is fingerprint data associated with the thumb, and if the pressure data of first intensity is obtained by the pressure sensor, the electronic device 1000 may execute a first SNS application. If the obtained fingerprint data is fingerprint data associated with the thumb, and if the pressure data of second intensity is obtained by the pressure sensor, the electronic device 1000 may execute a second SNS application. As another example, in the case where the electronic device 1000 obtains pressure data of first intensity, the electronic device 1000 may execute a first function of a first application. In the case where the electronic device 1000 obtains pressure data of second intensity, the electronic device 1000 may execute a second function of the first application.

Figure 11A:
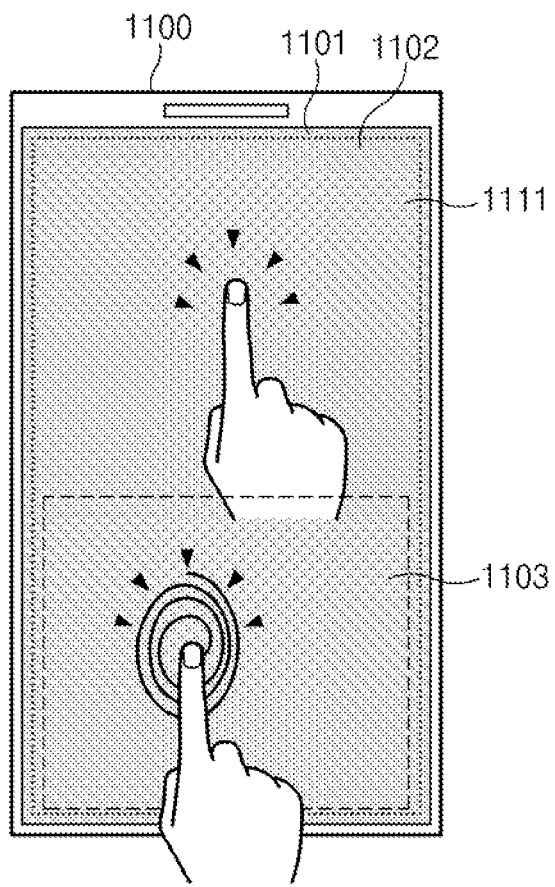
Figure 11B:
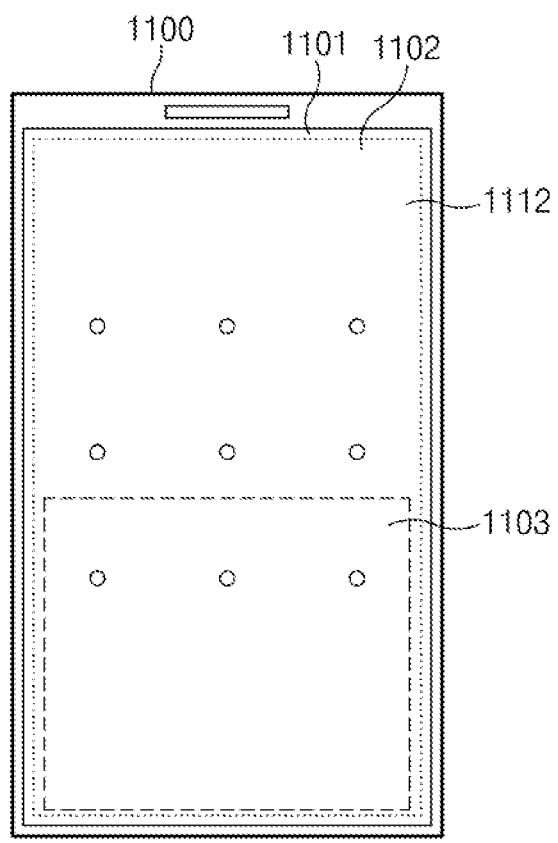
Figure 11C:
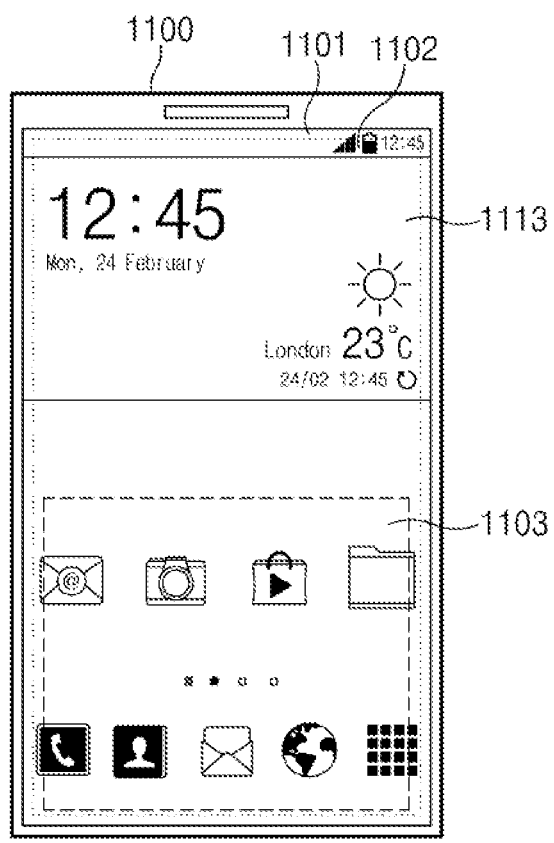

FIGS. 11A, 11B, and 11C are views illustrating wakeup of an electronic device according to an embodiment of the present disclosure.

Referring to FIG. 11A, an electronic device 1100 may be in a sleep mode state for providing a turned off screen 1111. For example, the turned-off screen may be a black screen in which at least a portion of power of a display of the electronic device 1100 is interrupted.

According to various embodiments, while the electronic device 1100 operates in the sleep mode, a user may apply pressure to a part of a screen area 1101 by using a finger. In this case, the part of the screen area 1101 may be an area overlapping with a pressure sensing area 1102. While the pressure by the finger is applied to the part of the screen area 1101, the electronic device 1100 may obtain pressure data associated with the pressure by using a pressure sensor. If the pressure data is obtained, the electronic device 1100 may recognize the pressure data as a trigger signal, may exit the sleep mode, and may operate in a wakeup mode. As such, as illustrated in FIG. 11B, the electronic device 1100 may display a lock screen 1112 in the wakeup mode. As another example, in the case where a mode of the electronic device 1100 is not set as a lock mode, the electronic device 1100 may display a main home screen (not illustrated) in the wakeup mode.

In the case where the finger of the user touches an area in which the pressure sensing area 1102 and a fingerprint sensing area 1103 overlap with each other, the electronic device 1100 may obtain fingerprint data associated with the fingerprint by using a fingerprint sensor. The electronic device 1100 may compare data associated with the obtained fingerprint data with at least one of piece of reference fingerprint data associated with reference fingerprints stored in a memory of the electronic device 1100. Referring to FIG. 11C, when the comparison result indicates that the obtained fingerprint data and reference fingerprint data match, the electronic device 1100 may display an unlock screen 1113.

As illustrated in FIG. 11A, when the finger of the user is touched on an area which overlaps with the pressure sensing area 1102 in the screen area 1101 and which does not overlap with a fingerprint sensing area 1103, the electronic device 1100 may display the fingerprint recognition requesting UI 722 that is illustrated above with reference to FIG. 7D.

Figure 12A:
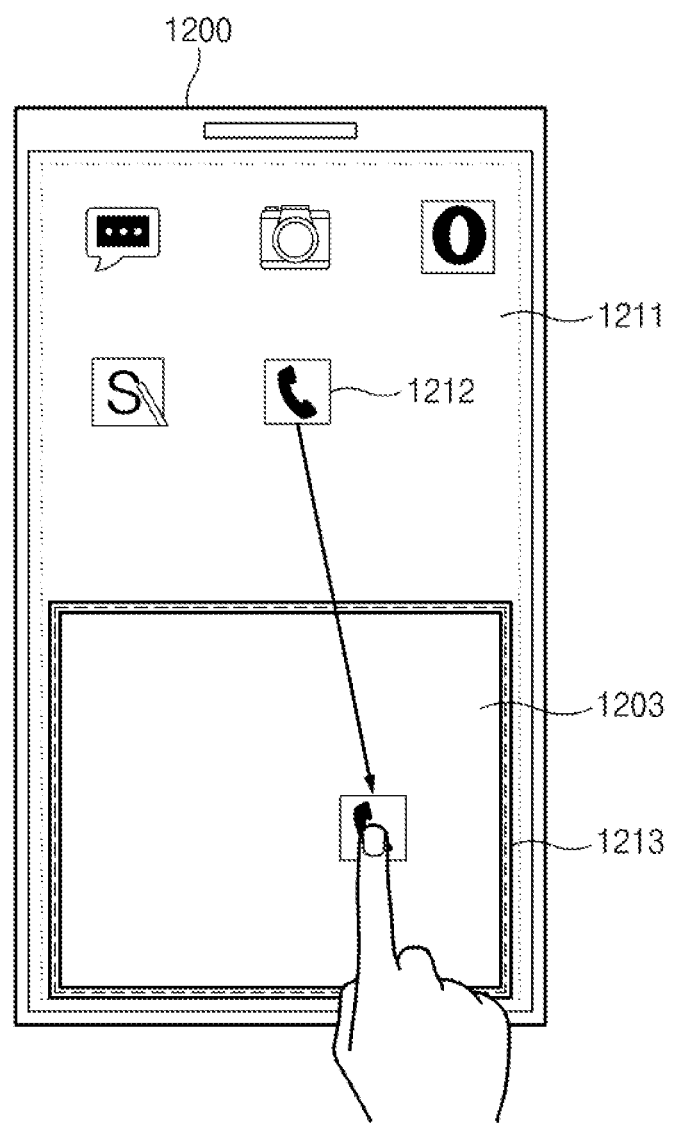
Figure 12B:
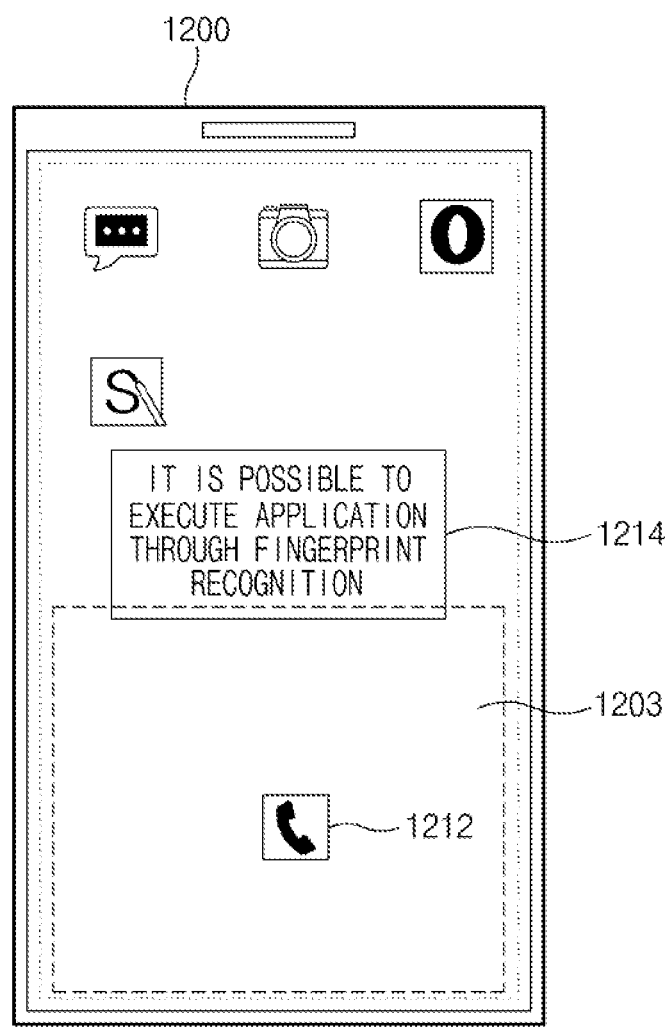

FIGS. 12A and 12B are views illustrating setting security of an application according to an embodiment of the present disclosure.

Referring to FIG. 12A, an electronic device 1200 may display a security setting screen 1211 for setting security of an application. Various content for causing the electronic device 1200 to execute functions and commands may be included in the security setting screen 1211. In the security setting screen 1211, if a user selects an icon 1212 to be moved, the electronic device 1200 may display a guide 1213 indicating a fingerprint sensing area 1203. If the guide 1213 is displayed, the user may move the selected icon 1212 to the fingerprint sensing area 1203.

According to various embodiments, if the selected icon 1212 is moved to the fingerprint sensing area 1203, the electronic device 1200 may set an application associated with the selected icon 1212 as a lock function setting application. For example, the lock function setting application may be an application which is capable of being executed through authentication (e.g., fingerprint recognition, an encryption input, or the like) or in which a part of function of an application is being executed through authentication. The electronic device 1200 may provide information about an application with respect to which the lock function is set. Referring to FIG. 12B, the electronic device 1200 may display a guide UI 1214 indicating that the application corresponding to the selected icon 1212 that is capable of being executed based on the fingerprint. The guide UI 1214 may include a text indicating that security of an application is set, for example, 'The application is executed through fingerprint recognition', 'The application is authenticated through the fingerprint recognition', or the like.

If a lock function is set with respect to the application, the electronic device 1200 may sense a touch, pressure, or a fingerprint by the finger of the user contacting an area where the selected icon 1212 is displayed, and may execute a specified operation based on the sensed touch, pressure, or fingerprint. For example, the electronic device 1200 may perform one of various functions described with reference to FIGS. 7A and 7B.

Referring to FIG. 12A, after the lock function is set with respect to the application associated with a selected icon 1212, the pressure may be applied to an area by the finger of the user in which the selected icon 1212 is displayed. The electronic device 1200 may obtain fingerprint data of the finger. In the case where the obtained fingerprint data is matched to reference fingerprint data, the electronic device 1200 may display the execution screen of the application corresponding to the selected icon 1212. Alternatively, if the area where the selected icon 1212 is displayed is touched by the finger of the user, as in the embodiment described in FIG. 7B, the electronic device 1200 may display a fingerprint recognition requesting UI in the screen. If the user touches a part of the screen area by using the finger with reference to the fingerprint recognition requesting UI, the electronic device 1200 may obtain the fingerprint data. In the case where the obtained fingerprint data is matched to the reference fingerprint data, the electronic device 1200 may display the execution screen of the application corresponding to the selected icon 1212.

According to an embodiment, before the area where the selected icon 1212 is displayed is touched by the finger of the user, the electronic device 1200 may perform the fingerprint recognition first. For example, if an area, where the selected icon 1212 is not displayed, in the fingerprint sensing area 1203 is touched by the finger of the user, the electronic device 1200 may obtain fingerprint data of the finger and may perform the fingerprint recognition by comparing the obtained fingerprint data with the reference fingerprint data. If the fingerprint recognition is completed, the electronic device 1200 may display a lock function setting application to be distinguished from a lock function unsetting application. For example, the electronic device 1200 may display an icon of the lock function setting application in color and may display an icon of the lock function unsetting application in black and white. As another example, the electronic device 1200 may display the icon of the lock function setting application by using a highlight effect or may apply an animation effect to the icon of the lock function setting application. According to an embodiment, if the area where the selected icon 1212 is displayed is touched by the user within a specified time period after the fingerprint recognition is completed, the electronic device 1200 may display the execution screen of the application corresponding to the selected icon 1212 without additional fingerprint recognition.

According to various embodiments of the present disclosure, an electronic device may include a housing including a first surface facing a first direction and a second surface facing a second direction opposite to the first direction, a touch display located between the first surface and the second surface and including a screen displayed to face the first surface, a pressure sensing circuit located between the first surface and the second surface, a fingerprint sensor located between the first surface and the second surface, a processor located inside the housing and electrically connected with the touch display, the pressure sensing circuit, and the fingerprint sensor, and a memory located inside the housing and electrically connected with the processor. The pressure sensing circuit may be configured to sense pressure applied to the touch display by a finger. The fingerprint sensor may include a fingerprint sensing area overlapping with at least 1/30 of a screen area, in which the screen is displayed, and is configured to sense a fingerprint of the finger through the fingerprint sensing area. The memory may store pieces of reference fingerprint data associated with a plurality of reference fingerprints respectively corresponding to a plurality of functions of the electronic device. The processor may be configured, while the pressure is applied by the finger to a part of the screen area overlapping with the fingerprint sensing area, to receive first data associated with the pressure applied by the finger from the pressure sensing circuit, to receive second data associated with the fingerprint of the finger from the fingerprint sensor, to compare the received second data with at least one of the pieces of reference fingerprint data, and to execute a function selected from the plurality of functions, based at least a part on the comparison result.

According to an embodiment, the processor may be configured to detect the pressure applied to a part of the screen by the finger of a user when the screen is turned off, and to turn on the screen if the pressure is detected.

According to an embodiment, the processor may be configured to detect the pressure applied to a part of the screen by the finger of a user when the screen is turned off and is in a lock state, to turn on the screen if the pressure is detected and to unlock the screen before the selected function is executed, based on the comparison result.

According to an embodiment, the fingerprint sensing area may overlap with a half or more of the screen area.

According to an embodiment, the first surface may include a first periphery having a first length, a second periphery having a second length longer than the first length and extending to be perpendicular to the first periphery, a third periphery having the first length and extending to be parallel with the first periphery, and a fourth periphery having the second length and extending to be parallel with the second periphery. The electronic device further may include a speaker located between the first periphery and one side surface of the touch display. The fingerprint sensing area may be closer to the third periphery than the first periphery when viewed from above.

According to an embodiment, the memory may further store an OS, an API, and a plurality of applications configured to operate in the OS through the API. The functions of the electronic device may include one or more functions associated with at least one of the plurality of application programs.

According to an embodiment, the plurality of application programs may include a telephony application, a text input application, a message application, a social network service application, a voice recognition application, a schedule management application, a calendar application, and a web browser application.

According to an embodiment, the processor may be configured, if the electronic device operates in a lock screen mode, to switch from the lock screen mode to an unlock mode, and to execute one selected from the plurality of functions, based on the comparison result.

According to an embodiment, the processor may be configured to execute one of a plurality of functions that an application is capable of providing, based on the comparison result, if a part of the screen area is an area in which identification information of the application is displayed.

According to an embodiment, the processor may be configured to execute an application with respect to which a lock function is released, based on the comparison result, if a part of the screen area is an area in which identification information of the application with respect to which the lock function is set is displayed.

According to an embodiment, the reference fingerprint data associated with the plurality of reference fingerprints respectively correspond to at least one of a plurality of functions of the electronic device. According to an embodiment, when the processor identifies the selected function, the processor is configured to compare the second data to the reference fingerprint data to identify a matching fingerprint data, and identify the selected function corresponding to the matching fingerprint data.

According to an embodiment, when the processor identifies the selected function, the processor is configured to identify a first function as the selected function from among a plurality of functions corresponding to the second data, when first data exceeds a threshold, and identify a second function as the selected function from among the plurality of functions corresponding to the second data, when the first data does not exceed the threshold.

According to an embodiment, when the processor identifies the selected function, the processor is configured to compare the second data to the reference fingerprint data to identify a matching fingerprint data, and when matching fingerprint data is identified, identify an application corresponding to a location of the fingerprint, and identify a function of the identified application as the selected function. According to an embodiment, when the processor executes the selected function, the processor is configured to when a lock function is set on the application, execute the selected function of the application in a state that the lock function is released.

According to an embodiment, the processor may be configured to switch from a sleep mode to a wakeup mode, if the first data is received in a state where the electronic device operates in the sleep mode.

According to an embodiment, the fingerprint sensing area may include a fingerprint available area in which the second data are processed and a fingerprint unavailable area in which the second data are not processed.

Figure 13:
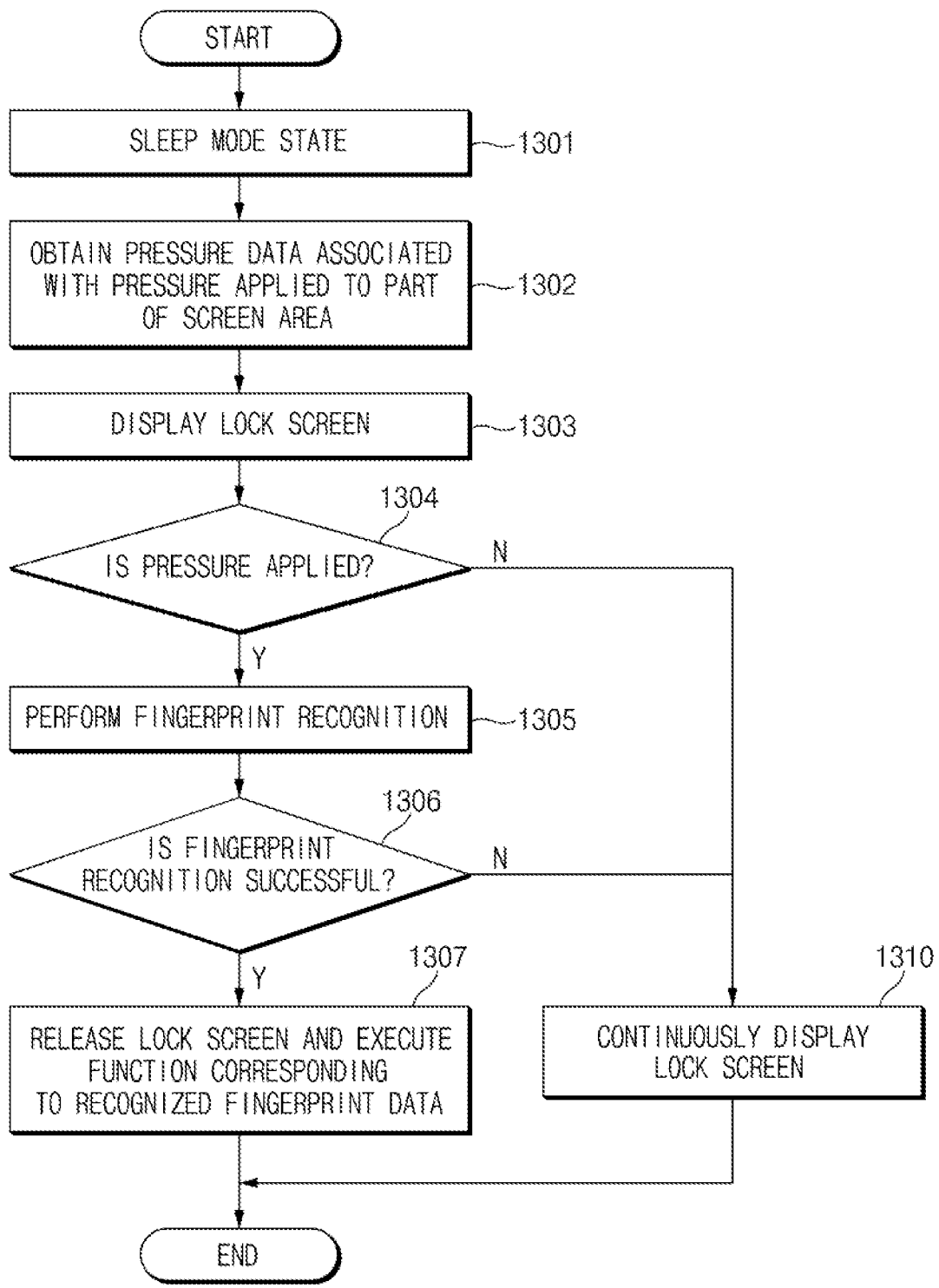
FIGS. 13, 14, 15, and 16 are flowcharts in which one of a plurality of functions of an electronic device is executed according to various embodiments of the present disclosure.

FIG. 13 is a flowchart for describing executing one of a plurality of functions of an electronic device according to an embodiment of the present disclosure.

Referring to FIG. 13, in operation 1301, an electronic device may be in a sleep mode state in which a turned off screen is provided.

In operation 1302, the electronic device may obtain pressure data associated with pressure applied to a part of a screen area of a user. For example, the pressure applied to the part of the screen area may be generated by the finger of the user. For example, the part of the screen area may be an area overlapping with a pressure sensing area and/or a fingerprint sensing area.

In operation 1303, the electronic device may display a lock screen. The electronic device may display the lock screen in a wakeup mode. According to an embodiment, the electronic device may change the mode of electronic device based on the pressure data. For example, the electronic device may determine whether the pressure data obtained in operation 1302 satisfies a specified condition (e.g., whether the pressure data is not less than specified intensity or whether the pressure data is sensed in a specified screen area), may change from the sleep mode to the wakeup mode in the case where the pressure data satisfies the specified condition, and may display the lock screen in a display.

In operation 1304, the electronic device may determine whether the pressure is continuously applied to a part of the pressure sensing area. For example, the electronic device may determine whether the obtained pressure data is not less than the specified intensity.

In operation 1310, the electronic device may continuously display the lock screen, in the case where the result determined in operation 1304 indicates that the part of the pressure sensing area is not in a state where the pressure is applied.

In the case where the result determined in operation 1304 indicates that the pressure is continuously applied to the part of the pressure sensing area (or in the case where the pressure data is not less than the specified intensity), in operation 1305, the electronic device may perform a fingerprint recognition operation. For example, the electronic device may obtain fingerprint data of an area at least partially overlapping with an area in which the pressure is maintained, and may perform the fingerprint recognition based at least a part on the obtained fingerprint data. For example, the electronic device may compare data associated with the obtained fingerprint with at least one of reference fingerprint data associated with a reference fingerprint stored in a memory of the electronic device.

In operation 1306, the electronic device may determine whether the fingerprint recognition is successful. For example, if the obtained fingerprint data and the reference fingerprint data are matched to each other, the electronic device may determine that the fingerprint recognition is successful. If there is no reference fingerprint data matched to the obtained fingerprint data, the electronic device may determine that the fingerprint recognition fails.

In operation 1310, the electronic device may continuously display the lock screen, in the case where the result determined in operation 1306 indicates that the fingerprint recognition fails.

In operation 1307, the electronic device may release the lock screen and may execute a function corresponding to the recognized fingerprint data, in the case where the result determined in operation 1306 indicates that the fingerprint recognition is successful. The function corresponding to the recognized fingerprint data may be a function corresponding to the reference fingerprint data matched to the recognized fingerprint data among pieces of reference fingerprint data.

In this case, the user may register functions, which are frequently used, for each fingerprint of the user and may employ each fingerprint as a shortcut function of an application. For example, the user may perform a favorite function that is capable of directly executing an application, which corresponds to the recognized fingerprint, from among a plurality of applications by using fingerprints of the fingers. For example, even in a state where the screen is turned off, ten applications corresponding to the number of fingers of the user may automatically release the lock screen and may be executed, according to the recognized fingerprint. As another example, the user may perform a favorite function that is capable of directly executing a specific function of an application corresponding to the recognized fingerprint, by using fingerprints of the fingers. Even in a state where the screen is turned off, ten functions corresponding to the number of fingers of the user may release the lock screen and may be automatically performed, according to the recognized fingerprint. For example, in the case where the application is a call application, functions of the application may make calls to destinations of the call application, respectively.

Figure 14:
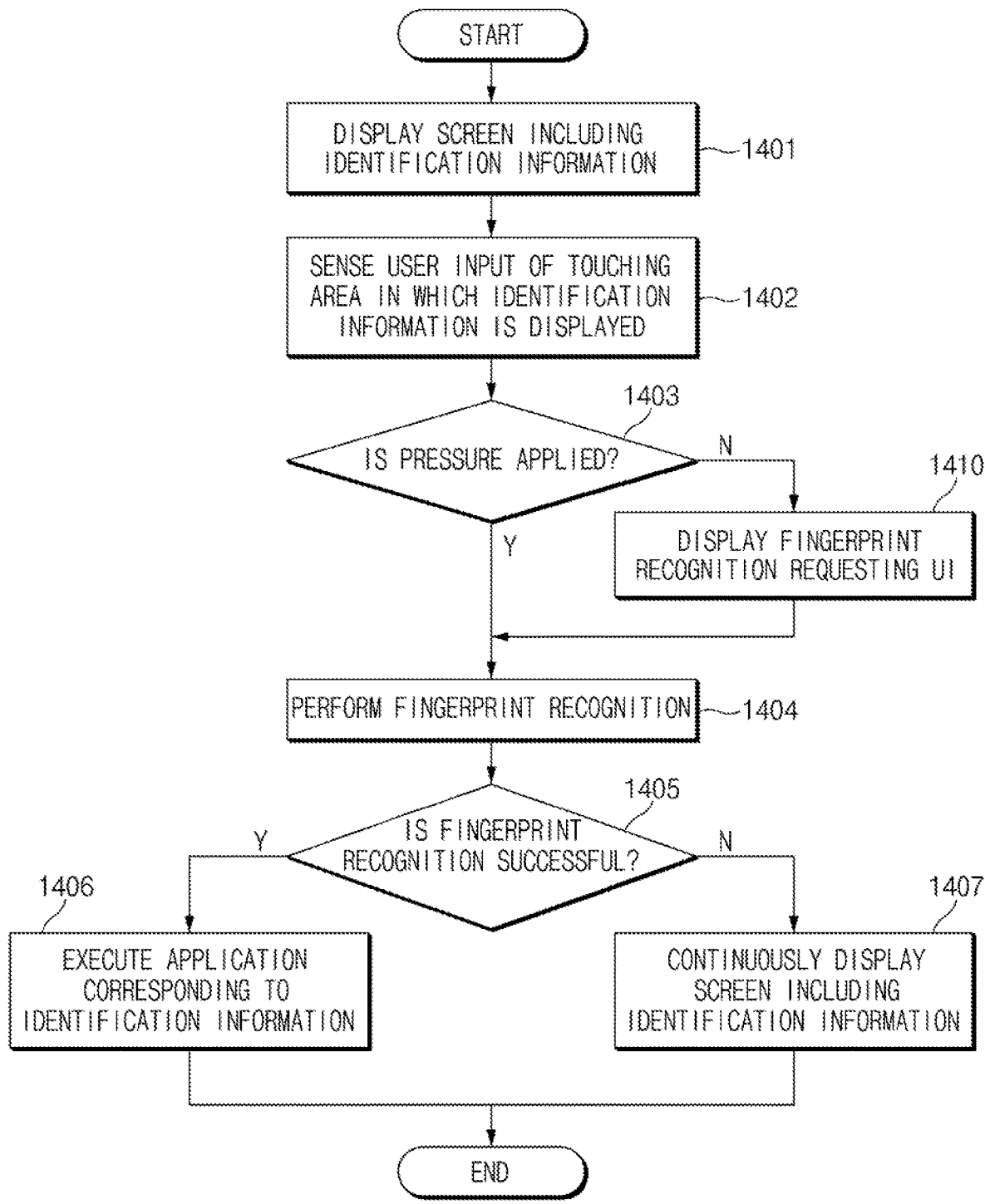

FIG. 14 is a flowchart for describing executing one of a plurality of functions of an electronic device according to another embodiment of the present disclosure.

Referring to FIG. 14, in operation 1401, an electronic device may display a screen including identification information of an application (e.g., an application icon or an application name) For example, the application corresponding to the identification information may be an application that needs fingerprint recognition. For example, the application may correspond to a financial application, a health application, an SNS application, an electronic wallet application, or the like that needs to protect personal information of a user.

In operation 1402, the electronic device may sense a user input of touching an area in which the identification information is displayed.

In operation 1403, the electronic device may determine whether the pressure is applied. For example, the electronic device may determine whether the pressure of specified intensity or more is applied by the user input to an area in which the identification information is displayed.

In operation 1403, if it is determined that the pressure is not applied (or if it is determined that the pressure of which the intensity is less than specified intensity is applied), according to various embodiments, in operation 1410, the electronic device may display a fingerprint recognition requesting UI in a screen.

In operation 1403, if it is determined that the pressure is applied (or if it is determined that the pressure of specified intensity or more is applied), according to various embodiments, in operation 1404, the electronic device may perform a fingerprint recognition operation. For example, the electronic device may receive fingerprint data through a fingerprint sensor and may execute the fingerprint recognition operation based on at least a portion of the received fingerprint data.

In operation 1405, the electronic device may determine whether the fingerprint recognition is successful. For example, the electronic device may determine whether the fingerprint recognition is successful, based at least a part on the fingerprint recognition operation of operation 1404.

In operation 1405, in the case where it is determined that the fingerprint recognition is successful, according to various embodiments, in operation 1406, the electronic device may execute an application corresponding to identification information. For example, in the case where the application corresponding to the identification information is a SNS application, the electronic device may access a server that operates in conjunction with the SNS application and may display an execution screen of an application as the access result.

In operation 1405, in the case where it is determined that the fingerprint recognition fails, according to various embodiments, in operation 1407, the electronic device may continuously display a screen including the identification information of an application without executing an application.

Figure 15:
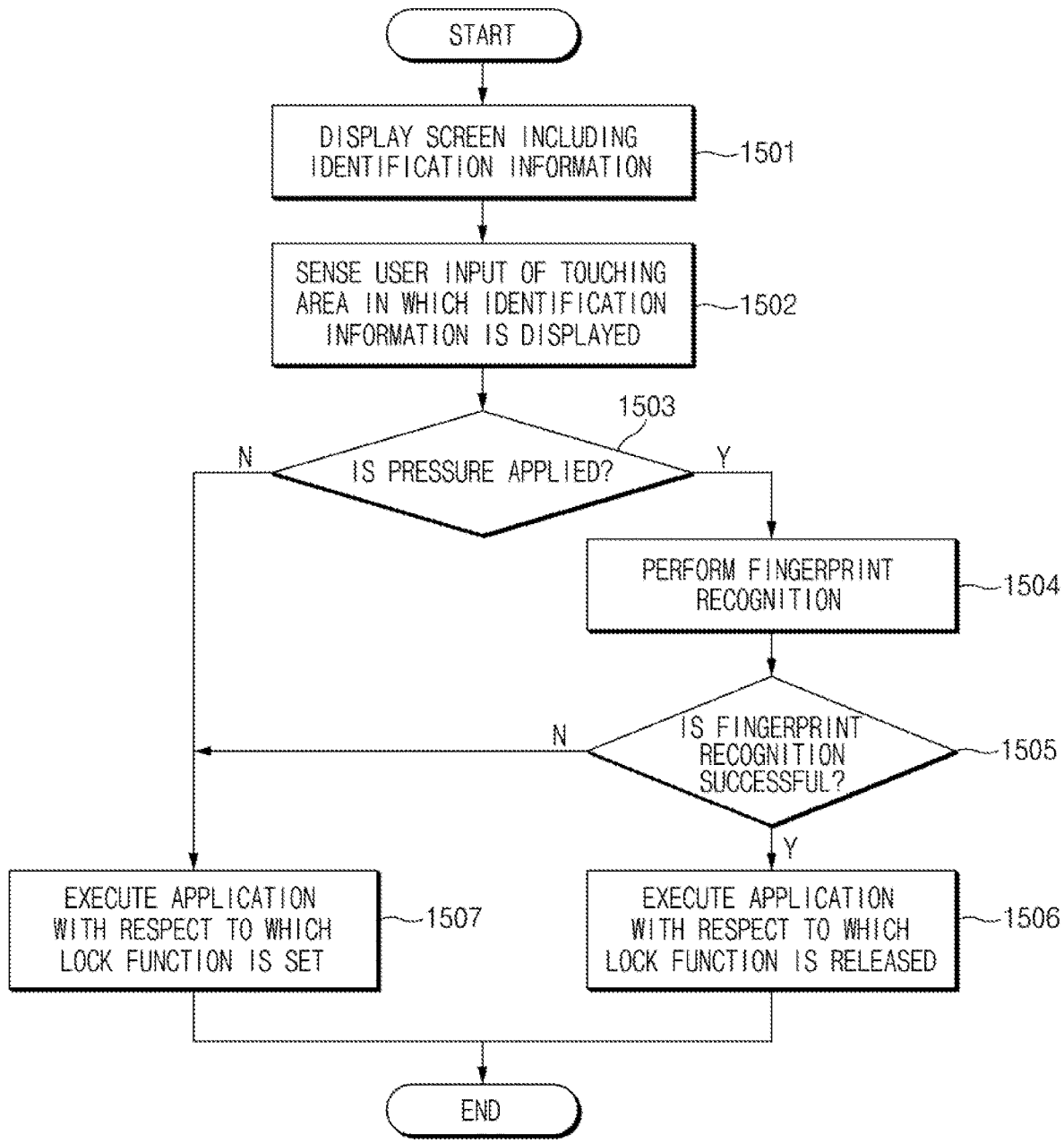

FIG. 15 is a flowchart for describing executing one of a plurality of functions of an electronic device according to another embodiment of the present disclosure.

Referring to FIG. 15, in operation 1501, an electronic device may display a screen including identification information of an application (e.g., an application icon or an application name).

In this case, one of functions that an application is capable of providing may refer to one function that sets a lock function and executes an application. Another function may refer to a function that releases the lock function and executes an application. For example, in the case where the application is a gallery application, one function may be a function with respect to which the lock function is set, and may be a function, which displays information (e.g., content or a thumbnail of content, or the like) other than content for which a user sets security. In addition, another function may be a function with respect to which the lock function is released, and may be a function, which displays information including content for which a user sets security.

In operation 1502, the electronic device may sense a user input for touching an area in which the identification information is displayed.

In operation 1503, the electronic device may determine whether the pressure is applied to an area in which the identification information. For example, the electronic device may determine whether the pressure of specified intensity or more is applied to an area in which the identification information is displayed.

In the case where the result determined in operation 1503 indicates that the pressure is applied (or in the case where the pressure of specified intensity or more is applied), in operation 1504, the electronic device may perform a fingerprint recognition operation. For example, the electronic device may receive fingerprint data of the finger and may perform fingerprint recognition by using the received fingerprint data.

In operation 1505, the electronic device may determine whether the fingerprint recognition is successful. For example, the electronic device may determine that the fingerprint recognition is successful, based at least a part on the fingerprint recognition operation of operation 1504.

In operation 1505, if the determination result indicates that the fingerprint recognition is successful, according to various embodiments, in operation 1506, the electronic device may release the lock function and may execute an application. For example, in the case where the application is a gallery application, the electronic device may display information including content for which the user sets security or a thumbnail thereof in a screen.

In operation 1505, if the determination result indicates that the fingerprint recognition fails, according to various embodiments, in operation 1507, the electronic device may execute the application with respect to which the lock function is set. For example, the electronic device may display information excluding the content for which the user sets security or the thumbnail thereof in the screen.

In operation 1503, in the case where the result in which the electronic device determines whether the pressure is applied to an area in which the identification information is displayed indicates that the pressure is not applied (or in the case where the pressure of which the intensity is less than specified intensity is applied), according to various embodiments, in operation 1507, the electronic device may execute the application with respect to which the lock function is set.

Figure 16:
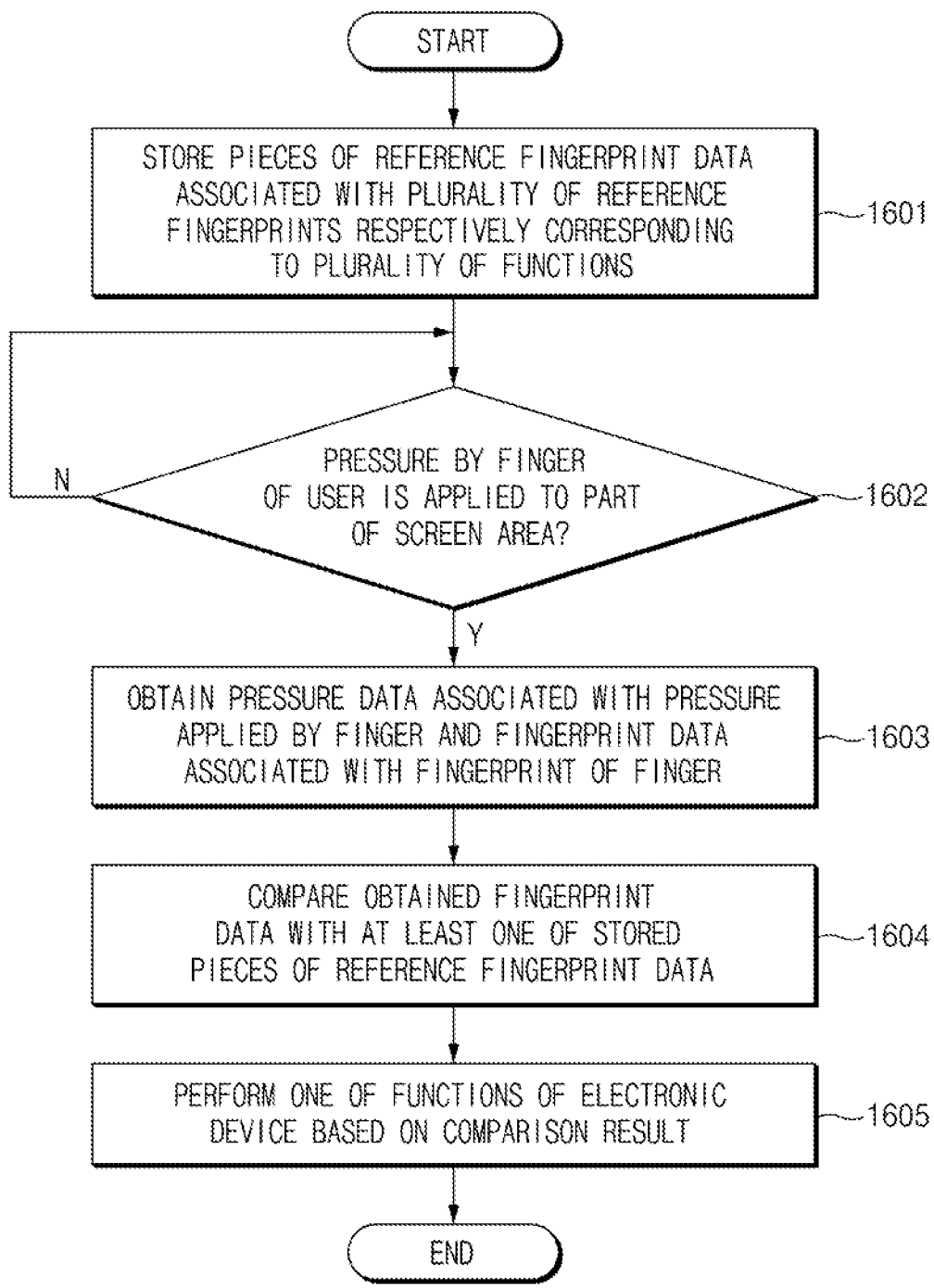

FIG. 16 is a flowchart for describing executing one of a plurality of functions of an electronic device according to another embodiment of the present disclosure.

Referring to FIG. 16, in operation 1601, an electronic device may store pieces of reference fingerprint data respectively associated with a plurality of reference fingerprints corresponding to a plurality of functions in a memory.

In operation 1602, the electronic device may determine whether pressure by a finger of a user is applied to a part of a screen area. For example, the electronic device may determine whether the pressure of specified intensity or more is applied to an area in which the identification information is displayed.

In operation 1602, in the case where the determination result indicates that the pressure is applied (or in the case where the pressure of specified intensity or more is applied), according to various embodiments, in operation 1603, the electronic device may obtain pressure data associated with the pressure applied by a finger and fingerprint data associated with the fingerprint of the finger.

In operation 1604, the electronic device may compare the obtained fingerprint data with at least one of the stored pieces of reference fingerprint data. For example, the pieces of reference fingerprint data may be reference fingerprint data stored in operation 1601.

In operation 1605, the electronic device may perform one of functions of an electronic device, based on the comparison result. For example, the electronic device may perform at least one of functions of the electronic device, based at least a part on the comparison result of data associated with the obtained fingerprint with at least one of pieces of reference fingerprint data.

When the electronic device operates in a lock screen mode, the electronic device may switch the lock screen mode of the electronic device to an unlock mode and may perform one of a plurality of functions, based on the comparison result.

When a part of the screen area is an area in which identification information of an application is displayed, the electronic device may perform one of a plurality of functions that the application is capable of providing, based on the comparison result.

When a part of the screen area is the area in which identification information of an application with respect to which the lock function is set is displayed, the electronic device may execute an application with respect to which the lock function is released, based on the comparison result.

When the electronic device operates in a sleep mode, if the pressure data is received, the electronic device may change from the sleep mode to a wakeup mode and may operate in the wakeup mode.

When a part of the screen area is touched by the finger of the user, the electronic device may display a fingerprint recognition requesting UI for requesting a fingerprint input by the finger.

According to various embodiments of the present disclosure, a function executing method of an electronic device may include storing pieces of reference fingerprint data of a plurality of reference fingerprints respectively corresponding to a plurality of functions of the electronic device, in a memory, while pressure is applied to a part of a screen area, in which a screen is displayed, by a finger of a user, receiving first data of the pressure applied by the finger through a pressure sensing circuit and receiving second data associated with a fingerprint of the finger through a fingerprint sensor, comparing the received second data with at least one of the stored pieces of reference fingerprint data associated with the plurality of reference fingerprints, and executing a function selected from the plurality of functions of the electronic device, based on the comparison result.

According to an embodiment, the executing of the function may include, if the electronic device operates in a lock screen mode, switching a lock screen mode of the electronic device to an unlock mode and executing one selected from the plurality of functions, based on the comparison result.

According to an embodiment, the executing of the function may include executing one of a plurality of functions that an application is capable of providing, based on the comparison result, if a part of the screen area is an area in which identification information of the application is displayed.

According to an embodiment, the executing of the function may include executing an application with respect to which a lock function is released, based on the comparison result, if a part of the screen area is an area in which identification information of the application with respect to which the lock function is set is displayed.

According to an embodiment, the method may further include switching from a sleep mode to a wakeup mode, if the first data is received in a state where the electronic device operates in the sleep mode.

According to an embodiment, the method may further include displaying a fingerprint recognition requesting UI for requesting a fingerprint input by the finger, while a part of the screen area is touched by the finger of the user.

According to an embodiment, the electronic device may include a fingerprint sensing area overlapping with at least a part of the screen area. The fingerprint sensing area may include a fingerprint available area in which the second data is processed and a fingerprint unavailable area in which the second data is not processed.

According to an embodiment, the electronic device may include a fingerprint sensing area overlapping with at least a part of the screen area. The fingerprint sensing area may overlap with a half or more of the screen area.

According to an embodiment, the method may further include storing an OS, an API, and a plurality of applications set to operate in the OS through the API. The functions of the electronic device may include one or more functions associated with at least one application.

According to an embodiment, the plurality of application programs may include a telephony application, a text input application, a message application, a social network service application, a voice recognition application, a schedule management application, a calendar application, and a web browser application.

The term "module" used herein may include a unit, which is implemented with hardware, software, or firmware, and may be interchangeably used with the terms "logic", "logical block", "component", "module", or the like. The "module" may be a minimum unit of an integrated component or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed. According to various embodiments, at least a part of an apparatus (e.g., modules or functions thereof) or a method (e.g., operations) may be, for example, implemented by instructions stored in a computer-readable storage media (e.g., the memory 130, the memory 230, or the memory 460) in the form of a program module. At least a part of the program module may be implemented (e.g., performed) by software, firmware, hardware (e.g., the processor 120, the processor 210, or the processor 470), or a combination of two or more thereof, and may include modules, programs, routines, sets of instructions, or processes for performing one or more functions.

The instruction, when executed by a processor, may cause the processor to perform a function corresponding to the instruction. The computer-readable recording medium may include a hard disk, a floppy disk, a magnetic media (e.g., a magnetic tape), an optical media (e.g., a compact disc read only memory (CD-ROM) and a digital versatile disc (DVD), a magneto-optical media (e.g., a floptical disk)), an embedded memory, and the like. The instruction may include codes created by a compiler or codes that are capable of being executed by a computer by using an interpreter. According to various embodiments, a module or a program module may include at least one of the above elements, or a part of the above elements may be omitted, or other elements may be further included. According to various embodiments, operations executed by modules, program modules, or other elements may be executed by a successive method, a parallel method, a repeated method, or a heuristic method, or at least one part of operations may be executed in different sequences or omitted. Alternatively, other operations may be added.

According to various embodiments of the present disclosure, even though an electronic device is in a sleep mode or a lock mode, a user may rapidly execute a desired specific function by applying pressure to a touch display. For example, in the case where a plurality of functions is respectively mapped to fingerprints of a plurality of fingers, the user may selectively execute one of the plurality of functions.

According to various embodiments of the present disclosure, the convenience of the user using the electronic device may be improved by reducing depth of a user input for executing one of the plurality of functions.

Besides, the effect obtained or estimated due to an embodiment of the present disclosure will be directly or allusively disclosed in detailed descriptions about the embodiment of the present disclosure. For example, various effects estimated according to an embodiment of the present disclosure will be described in the details to be described.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
   a touch display including a screen;
   a pressure sensing circuit configured to sense a pressure applied to the touch display by a finger;
   a fingerprint sensor configured to sense a fingerprint of the finger in a fingerprint sensing area that overlaps with at least a portion of a screen area corresponding to the screen;
   a memory configured to store reference fingerprint data associated with a plurality of reference fingerprints; and
   a processor configured to:
     receive the pressure by the finger in the fingerprint sensing area,
     obtain first data associated with the pressure from the pressure sensing circuit and second data associated with the fingerprint from the fingerprint sensor, and
     execute a function corresponding to the second data based on a comparison result of the second data and the reference fingerprint data,
   wherein, when the processor executes the function, the processor is further configured to:
     identify a first function as the function to be executed from among a plurality of functions corresponding to the second data based on the first data exceeding a threshold, and
     identify a second function as the function to be executed from among the plurality of functions corresponding to the second data based on the first data not exceeding the threshold, and wherein the first function is different from the second function.

2. The electronic device of claim 1, wherein the processor is further configured to:
   when the screen is turned off, detect the pressure, and
   in response to detecting the pressure, turn on the screen.

3. The electronic device of claim 1, wherein the processor is further configured to:
   when the screen is turned off and in a locked state, detect the pressure,
   in response to detecting the pressure, turn on the screen, and
   switch the screen to an unlocked state and execute the function.

4. The electronic device of claim 1, wherein the fingerprint sensing area overlaps with at least half of the screen area of the screen.

5. The electronic device of claim 1,
   wherein a first surface of a housing of the electronic device comprises:
     a first periphery having a first length,
     a second periphery substantially perpendicular to the first periphery and having a second length longer than the first length,
     a third periphery substantially parallel to the first periphery and having the first length, and
     a fourth periphery substantially parallel to the second periphery and having the second length,
   wherein the electronic device further comprises a speaker located between the first periphery and one side surface of the touch display, and
   wherein the fingerprint sensing area is closer to the third periphery than the first periphery when viewed from above.

6. The electronic device of claim 1,
   wherein the memory is further configured to store an operating system, an application programming interface, and a plurality of applications configured to operate in the operating system using the application programming interface, and
   wherein a plurality of functions of the electronic device include one or more functions associated with at least one of the plurality of applications.

7. The electronic device of claim 6, wherein the plurality of applications include a telephony application, a text input application, a message service application, a social network service application, a voice recognition application, a schedule management application, a calendar application, and a web browser application.

8. The electronic device of claim 1,
   wherein the reference fingerprint data associated with the plurality of reference fingerprints respectively correspond to at least one of a plurality of functions of the electronic device, and
   wherein, when the processor executes the function, the processor is further configured to:
     compare the second data to the reference fingerprint data to identify a matching fingerprint data, and
     execute the function corresponding to the matching fingerprint data.

9. The electronic device of claim 1,
   wherein, when the processor executes the function, the processor is further configured to:
     compare the second data to the reference fingerprint data to identify a matching fingerprint data,
     when matching fingerprint data is identified, identify an application corresponding to a location of the fingerprint, and
     execute one function of the identified application as the function, and
   wherein, when the processor executes the function, the processor is further configured to, when a lock function is set on the application, execute the function of the application in a state that the lock function is released.

10. The electronic device of claim 9, wherein the processor is further configured to, when the first data is obtained and the electronic device is operating in a sleep mode, switch from the sleep mode to a wakeup mode.

11. The electronic device of claim 1, wherein the fingerprint sensing area includes a fingerprint available area in which the second data is processed and a fingerprint unavailable area in which the second data is not processed.

12. A function executing method of an electronic device, the method comprising:
   receiving a pressure by a finger to a fingerprint sensing area that overlaps with a part of a screen of a touch display,
   obtaining first data associated with the pressure using a pressure sensing circuit and second data associated with a fingerprint of the finger using a fingerprint sensor; and
   executing a function corresponding to the second data based on a comparison result of the second data and reference fingerprint data associated with a plurality of reference fingerprints stored in the electronic device,
   wherein the executing of the function comprises:
     identifying a first function as the function to be executed from among a plurality of functions corresponding to the second data based on the first data exceeding a threshold, and identifying a second function as the function to be executed from among the plurality of functions corresponding to the second data based on the first data not exceeding the threshold, and wherein the first function is different from the second function.

13. The method of claim 12, wherein the reference fingerprint data respectively corresponds to at least one of a plurality of functions of the electronic device, and wherein the executing of the function further comprises:
  comparing the second data to the reference fingerprint data to identify a matching fingerprint data, and
  executing the function corresponding to the matching fingerprint data.

14. The method of claim 12, wherein the executing of the function further comprises:
  comparing the second data to the reference fingerprint data to identify a matching fingerprint data,
  when the matching fingerprint data is identified, identifying an application corresponding to a location of the fingerprint, and
  executing a function of the identified application as the function, and wherein the executing of the function further comprises, when a lock function is set on the application, execute the function of the application in a state that the lock function is released.

15. The method of claim 12, further comprising, when the first data is obtained and the electronic device is in a sleep mode, switching from the sleep mode to a wakeup mode.

16. The method of claim 12, further comprising, when a portion of the screen is touched by the finger, displaying a fingerprint recognition requesting user interface (UI) for requesting a fingerprint input by the finger.

17. The method of claim 12, wherein the fingerprint sensing area includes a fingerprint available area in which the second data is processed and a fingerprint unavailable area in which the second data is not processed.

18. The method of claim 12, wherein the fingerprint sensing area overlaps with at least half of a screen area corresponding to the screen.

* * * * *